US010582227B2

(12) United States Patent
He et al.

(10) Patent No.: US 10,582,227 B2
(45) Date of Patent: Mar. 3, 2020

(54) SCALABLE CODING BASED VIDEO DISTRIBUTION

(71) Applicant: Vid Scale, Inc., Wilmington, DE (US)

(72) Inventors: Yong He, San Diego, CA (US); Yuwen He, San Diego, CA (US); Yan Ye, San Diego, CA (US); Ralph Neff, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 16/069,975

(22) PCT Filed: Jan. 17, 2017

(86) PCT No.: PCT/US2017/013724
§ 371 (c)(1),
(2) Date: Jul. 13, 2018

(87) PCT Pub. No.: WO2017/124083
PCT Pub. Date: Jul. 20, 2017

(65) Prior Publication Data
US 2019/0028743 A1 Jan. 24, 2019

Related U.S. Application Data

(60) Provisional application No. 62/279,524, filed on Jan. 15, 2016.

(51) Int. Cl.
*H04N 7/173* (2011.01)
*H04N 21/231* (2011.01)
(Continued)

(52) U.S. Cl.
CPC ... *H04N 21/23106* (2013.01); *H04N 21/2183* (2013.01); *H04N 21/2225* (2013.01);
(Continued)

(58) Field of Classification Search
CPC ............... H04N 21/44209; H04N 21/44227
See application file for complete search history.

(56) References Cited

U.S. PATENT DOCUMENTS

2011/0299606 A1* 12/2011 Chen .................. H04L 29/08
375/240.26
2014/0267714 A1* 9/2014 Mistry ................ H04N 21/631
348/143
(Continued)

FOREIGN PATENT DOCUMENTS

CN 105577822 A 5/2016
WO WO 2015/150737 A1 10/2015

OTHER PUBLICATIONS

Aaron et al., "Netflix on Future Video Coding", ISO/IEC JTC 1/SC 29/WG 11 N35771,Geneva, CH, Feb. 2015, 3 pages.
(Continued)

*Primary Examiner* — Gigi L Dubasky
(74) *Attorney, Agent, or Firm* — Condo Roccia Koptiw LLP

(57) ABSTRACT

Media content coded using scalable coding techniques may be cached among a group of cache devices. Layered segments of the media content may be pre-loaded onto the cache devices, which may be located throughout a content distribution network, including a home network. The caching location of the media content may be determined based on multiple factors including a content preference associated with the group of cache devices and device capabilities. A cache controller may manage the caching of the media content.

19 Claims, 23 Drawing Sheets

(51) Int. Cl.
H04N 21/2183 (2011.01)
H04N 21/258 (2011.01)
H04N 21/2225 (2011.01)
H04N 21/2343 (2011.01)
H04N 21/24 (2011.01)
H04N 21/436 (2011.01)

(52) U.S. Cl.
CPC ... *H04N 21/23439* (2013.01); *H04N 21/2402* (2013.01); *H04N 21/25825* (2013.01); *H04N 21/25833* (2013.01); *H04N 21/25891* (2013.01); *H04N 21/436* (2013.01)

(56) References Cited

U.S. PATENT DOCUMENTS

| | | | |
|---|---|---|---|
| 2015/0208120 A1* | 7/2015 | Yao | H04N 21/25833 725/9 |
| 2015/0249848 A1 | 9/2015 | Holman | |
| 2016/0198225 A1 | 7/2016 | Reznik et al. | |

OTHER PUBLICATIONS

Aaron, Anne, "Video Encoding at Netflix Panel Discussion on Future Video Coding", 2014, 11 pages.

Abrahamsson et al., "Caching for IPTV Distribution with Time-Shift", International Conference on Computing, Networking and Communications, Communication QoS and System Modeling Symposium, Jan. 28-31, 2013, 6 pages.

Barnett, Jr., "Cisco Visual Networking Index (VNI) Complete IP Traffic & Service Adoption Forecasts Global Update, 2014-2019", Cisco Knowledge Network, Jun. 2015, 84 pages.

Bilton, Ricardo, "5 Charts: The Shifting Landscape of Digital Video Consumption", Digiday, Available at https://digiday.com/media/shifting-state-digital-video-consumption-5-charts/, Sep. 9, 2014, 4 pages.

Border, Ed, IHS Technology—The Future of Video Distribution, Consumer Electronics & Video Technology Intelligence Service, Mar. 2015, 12 pages.

Boyce et al., "Draft High Efficiency Video Coding (HEVC) Version 2, Combined Format Range Extensions (RExt), Scalability (SHVC), and Multi-View (MV-HEVC) Extensions", JCTVC-R1013, 18th Meeting: Sapporo, JP, Jun. 30-Jul. 9, 2014, 382 pages.

Ericsson, "LTE Broadcast", Available at https://archive.ericsson.net/service/internet/picov/get?DocNo=1/28701-FGD101187&Lang=EN&HighestFree=Y, Feb. 2013, 13 pages.

Ericsson, "Media Vision: 2020", 2014, 12 pages.

Grafl et al., "Scalable Media Coding Enabling Content-Aware Networking", IEEE MultiMedia, vol. 20, No. 2, Apr.-Jun. 2013, pp. 30-41.

Grandl et al., "On the Interaction of Adaptive Video Streaming with Content-Centric Networking", Packet Video Workshop, Jul. 3, 2013, 8 pages.

Hartanto et al., "Caching Video Objects: Layers vs Versions?", Proceedings of IEEE International Conference on Multimedia and Expo (ICME), vol. 31, No. 2, Sep. 23, 2006, pp. 221-245.

ISO/IEC, "Information Technology-Dynamic Adaptive Streaming over HTTP (DASH)—Part 1: Media Presentation Description and Segment Formats", ISO/IEC 23009-1:2014, 2nd Edition, May 15, 2014, 152 pages.

ISO/IEC, "Information Technology—Generic Coding of Moving Pictures and Associated Audio Information: Video", ISO/IEC 13818-2, Dec. 2000, 220 pages.

ITU-R, "Parameter Values for UHDTV Systems for Production and International Programme Exchange", ITU-R Recommendation BT.2020, Apr. 2012, 8 pages.

ITUT-T, "Advanced Video Coding for Generic Audiovisual Services", ITU-T Rec H.264 and ISO/IEC/MPEG 4 part 10, Nov. 2007, 563 pages.

LG/ETRI, "ATSC Standard: Video—HEVC (A/341)", Advanced Television Systems Committee, Washington, D.C., May 19, 2017, 30 pages.

Luthra et al., "Call for Evidence (CfE) for HDR and WCG Video Coding", ISO/IEC JTC1/SC29/WG11, Doc. N15083, Geneva, Switzerland, Feb. 2015, 46 pages.

Nielsen, "The Total Audience Report: Q4 2014", Available at http://www.nielsen.com/us/en/insights/reports/2015/the-total-audience-report-q4-2014.html, Mar. 11, 2015, 4 pages.

Pande et al., "Video Delivery Challenges and Opportunities in 4G Networks", IEEE MultiMedia, vol. 20, No. 3, Aug. 26, 2013, pp. 88-94.

SMPTE, "Mastering Display Color Volume Metadata Supporting High Luminance and Wide Color Gamut Images", ST 2086:2014, Oct. 30, 2014, 6 pages.

Son, Jangwoo, "2013 Content Networking Trends—OTT, Global CDN and Operator CDN", Netmanias/NMC Consulting Group, Sep. 4, 2013, 72 pages.

Sullivan et al., "Standardized Extensions of High Efficiency Video Coding (HEVC)", IEEE Journal of Selected Topics in Signal Processing, vol. 7, No. 6, Dec. 2013, pp. 1001-1016.

Ye et al., "The Scalable Extensions of HEVC for Ultra-High-Definition Video Delivery", IEEE MultiMedia, vol. 21, No. 3, Jul. 22, 2014, pp. 58-64.

* cited by examiner

SCALABLE CODING BASED VIDEO DISTRIBUTION

CROSS-REFERENCE TO RELATED APPLICATIONS

This application is a National Stage entry under U.S.C. § 371 of Patent Cooperation Treaty Application PCT/US2017/013724, filed Jan. 17, 2017, which claims the benefit of provisional U.S. patent application No. 62/279,524, filed Jan. 15, 2016, the disclosure of which is incorporated herein by reference in its entirety.

BACKGROUND

The landscape of video distribution may have shifted from legacy cable and/or satellite broadcasting towards on-demand content delivery. On-demand delivery may be IP based, e.g., via a fixed and/or mobile network. Video consumption and its associated revenue growth may depend on user experience. Device capabilities, network accessibility, content diversity, and/or other factors may drive the user experience. Multicast and broadcast delivery techniques may be used to provide content with reasonable cost efficiency, but they might not meet the requirements imposed by viewing habit changes (e.g., on-demand viewing, higher resolution, higher frame rate, multi-view, etc.). Unicast may deliver content to an individual user directly, but it may be difficult to meet increasing consumer demand within a reasonable timeframe. A blended multicast and unicast video distribution solution such as content distribution network (CDN) or edge caching may balance the demand and supply to a certain degree. However, as video traffic continues to explode (e.g., due to demand for advanced video features such as high resolution, high frame rate, HDR/WCG and multi-view), such a blended solution may not scale efficiently.

System, methods, and instrumentalities are described herein for distributing media content among a group of cache devices. The media content may be available at a content source (e.g., the content source may include a content server, a content service, an edge server, and/or any other sources from where media content may be retrieved). The media content may include one or more content objects. At least a subset of the content objects may have been coded using scalable coding techniques, and may comprise a plurality of scalable layers including a base layer and an enhancement layer. The enhancement layer may have a higher resolution and/or a wider color gamut than the base layer. The enhancement layer may have a different format and/or represent a different view of a scene than the base layer. The enhancement layer may depend on the base layer for decoding and/or playback. The group of cache devices may include a CDN cache server, an edge cache device, a home gateway, an end user device, and/or the like. One or more of the cache devices may be capable of decoding and playing back a content object. The cache devices may be connected via a network including a wired or a wireless network. Content preference information associated with the group of cache devices may be received by a controller configured to manage the distribution of the media content. The content preference information may include a viewing history and/or a subscription (e.g., a subscription to a TV channel or a streaming service) associated with one or more cache devices. The controller may monitor content availability associated with the content source and determine that a content object is available at the content source. The controller may receive scalability information e.g., from the content source) associated with the content object and device property information associated with the group of cache devices. The scalability information may include resolution and/or color gamut information of the scalable layers (e.g., a base layer and/or an enhancement layer) of the content object available at the content source, for example. The device property information may include a display resolution, a storage size, an available network bandwidth, a caching history, a viewing habit, a decoding capability, and/or an access permission of one or more of the group of cache devices. The device property information may be obtained via device discovery (e.g., using a device discovery protocol such as Universal Plug and Play (UPnP)).

The controller may determine that a content object available at the content source is relevant to at least one cache device of the group of cache devices based on the content preference information associated with the group of cache devices. In an example, the determination of relevance may be made if a viewing history of a cache device (or a user of the cache device) indicates a preference for the content object. In an example, the determination of relevance may be made if a subscription associated with a cache device indicates a preference for the content object. In an example, the content object may be determined to be relevant to a cache device (e.g., a home gateway) because the cache device is associated with another device (e.g., an end user device connected to the home gateway) that has shown a preference for the content object (e.g., via a viewing history of the device or a subscription to the content object associated with the device). In an example, the content object may be determined to be relevant to a cache device (e.g., an edge cache server) because the cache device is associated with another device (e.g., an end user device capable of accessing the edge cache server) that has shown a preference for the content object (e.g., via a viewing history of the device or a subscription to the content object associated with the device). The controller may determine, based on the scalability information associated with content object that the content object includes a base layer and an enhancement layer. The controller may select, based at least on the scalability information associated with the content object and the device property information associated with the group of cache devices, a first cache device from the group of cache devices for caching one of the base layer or enhancement layer of the content object. The controller may further select a second cache device from the group of cache devices for caching the other of the base layer or enhancement layer of the content object. For example, the controller may select the first cache device for caching the base layer upon determining that the first cache device is capable of storing and/or displaying the base layer of the content object. The controller may select the second cache device for caching the enhancement layer upon determining that the second cache device is capable of caching the enhancement layer of the content object. In an example, the group of cache devices may include a home gateway and a plurality of end user devices. The end user devices may be capable of connecting to the home gateway and playing back the content object. The content preference information associated with the group of cache devices may include respective content preferences of the plurality of end user devices (e.g., viewing histories and/or subscriptions associated with one or more of the end user devices). The controller may determine that the content object meets the content preferences of at least two of the plurality of end user devices and that the home gateway is capable of storing the base layer of the content object. The controller may select the home gateway to cache the base layer of the content object (e.g., so that the base layer may be shared by the at least two of the plurality end user devices). The controller may select one of the at least two end user devices that is capable of storing and/or displaying the enhancement layer to cache the enhancement layer of the content object.

The group of cache devices may include a cache server located outside a home network (e.g., on a CDN) and a home device within the home network that is capable of accessing the cache server. The content preference information associated with the group of cache devices may include a content preference of the home device. The controller in such scenarios may select the home device to cache the base layer of a content object upon determining that the content object meets the content preference of the home device and that the home device is capable of caching the base layer of the content object. The controller may select the cache server to cache the enhancement layer of the content object (e.g., so that the home device may stream the base layer from a local storage space and, when conditions permit, request the enhancement layer from the cache server). The home device described in the foregoing scenario may comprise at least one of a home gateway or an end user device, for example. In an example, the controller may receive device property information that includes the viewing habit of a cache device. The controller may determine, based on the viewing habit, that the cache device has been used to stream and/or view content outside a home network (e.g., via a cellular connection) at a frequency that exceeds a threshold value. The controller may decide in such cases to cache the base layer of a relevant content object on the cache device (e.g., so that the cache device may watch the base layer from a local storage cache while on a cellular connection and request the enhancement layer from a server when the cache device is connected to a home network).

The controller may receive access privilege information associated with the media content. The access privilege may allow only certain cache devices to access the media content, for example. Accordingly, the controller may select the cache devices that have access permission to the media content to cache the base layer of the media content. Since the enhancement layer depends on the base layer for decoding, an unauthorized device may not be able to play back the media content if the device has obtained only the enhancement layer of the media content.

Upon selecting the first cache device to store the base layer of the content object and the second cache device to store the enhancement layer of the content object, the controller may instruct the first and second cache devices to request/download their respective layers (e.g., from the content source).

The systems, methods, and instrumentalities described herein may be implemented on an end user device, a home gateway, a CDN server, or any other suitable type of devices.

BRIEF DESCRIPTION OF THE DRAWINGS

A more detailed understanding of the embodiments disclosed herein may be had from the following description, given by way of example in conjunction with the accompanying drawings.

DETAILED DESCRIPTION

Figure 1:
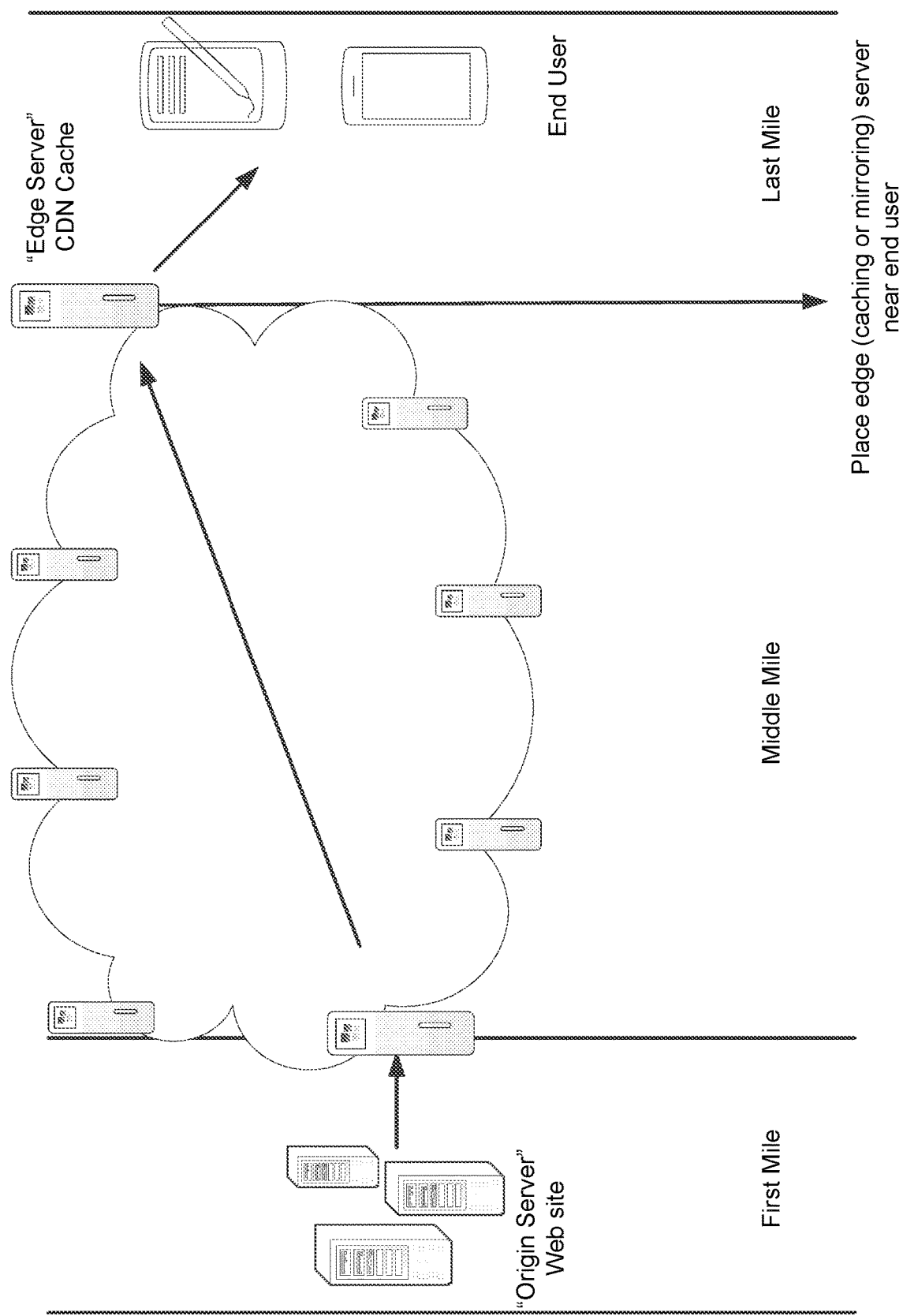
FIG. 1 shows an example CDN media content delivery system.

A detailed description of illustrative embodiments will now be described with reference to the various Figures. Although this description provides a detailed example of possible implementations, it should be noted that the details are intended to be exemplary and in no way limit the scope of the application.

Linear content distribution may be used by broadcasters, multi-system operators (MSOs) such as cable operators, and/or direct-broadcast satellite television operators to deliver media content. The cost for linear video distribution may be paid for by entities (e.g., operators, broadcasters or platforms) that produce and/or aggregate the media content. Revenue may be generated via subscription and/or advertising, for example.

Linear video distribution (e.g., linear TV) may have been on the decline. With technological innovations taking place in the video delivery chain (e.g., video compression technologies, network delivery technologies, and/or network infrastructure evolution), new forms of video delivery may emerge and/or grow. These new forms of video delivery may include non-linear, multi-device, and/or internet-based video streaming services, for example. More households may subscribe to these services. As video consumption moves away from a cable-centric mode and towards a consumer-driven mode, traditional video distribution mechanisms may change.

Connected devices may change the way videos are consumed. The landscape of connected devices may have shifted. For instance, mobile devices may have surpassed computers as the main form of connected devices, and may remain so for the future. Mobile usage (e.g., data, video, voice) may become an essential part of people's daily life. Services related to mobile usage may drive the business of mobile network operators (MNOs).

Multicast or broadcast may use a point-to-multipoint transmission architecture in which media content may be distributed centrally and received separately by multiple end-points. A broadcast or multicast approach may be an efficient solution for some services (e.g., live video streaming) but not for others (e.g., video on-demand as it may occur any time after content becomes available). Unicast may use a point-to-point transmission architecture in which an end-point (e.g., every end-point) may make a request for certain media content and the media content may be delivered to the end-point (e.g., separately and/or distinctively from deliveries to other end-points).

With traditional media distribution techniques (e.g., linear TV programming), viewing may be passive and/or one-directional. Program schedule may be fixed ahead of time and beyond a consumer's control. Services such as cable-based video on-demand (VOD), subscription based over-the-top (OTT) service, or apps-based video applications may allow consumers to obtain media content at a time and/place of their choice (e.g., anytime and/or anywhere). Video consumption through such services may be driven by audience engagement and/or retention, which may be based on individual consumers' personal content preference (e.g., which may be reflected through or derived from the consumer's viewing habits, viewing history, and/or service subscription).

The content preference of one consumer (e.g., which may be associated with the consumer's connected devices) may be different from that of another. For example, longer-form programs (e.g., over 30 minutes in length) may be consumed by connected set-top-boxes (STBs), computers, and some mobile devices (e.g., tablets), while short-form content or consumer-generated media content may be consumed by other mobile devices (e.g., mobile phones). The ability to deliver individualized media content may boost video consumption and/or create opportunities for personalized advertising and/or purchases. Costs associated with delivering content to consumers via unicast, however, may be significant. The costs may arise from demands for wider bandwidth, for better server capacity, for higher video quality (e.g., high definition (HD) or ultra-high definition (UHD) videos), and/or the like.

A hybrid delivery architecture may be employed for media content distribution and/or storage. For example, multicast/broadcast may be used to deliver large, popular linear content while unicast may be used to deliver less popular and more tailored media content. As viewing habits change, more and more consumers may prefer personalized and/or less time-dependent experience. Demand for intelligent recommendations for media content may increase. Customized content delivery may be desired. On-demand consumption may account for an increasing portion of viewing requests. Long-form programs may move from linear TV consumption to on-demand consumption. Unicast (e.g., unicast of longer-form media content) may see increased use in video delivery.

Video distribution may use a dedicated Content Delivery Network (CDN). A CDN may include a large number of cache servers. The cache servers may be deployed in a wide geographic area (e.g., worldwide). The cache servers may be used to push content to the edges of the Internet. FIG. 1 shows an example CDN media content delivery system. A CDN overlay may be employed, in which one or more edge servers may be positioned in a network edge node. The edge node may be between an origin server of content and an end user. A multicast network may be used to transport the content from the origin server to the edge node (e.g., to one or more edge servers located at the edge node). A unicast network may be used to reach the end user. Personalized viewing (e.g., "any content at any time" viewing) may be supported with a last-mile connection. For example, more popular content may be distributed using multicast to a collection of CDN caches (e.g., cache servers) simultaneously. The caches may store the popular content and may provide the content to an end user upon request. Server replication (e.g., having multiple servers with premium connectivity and/or storage capacities) may increase the deployment costs of CDNs. The introduction of new video formats and/or a wider variety of user devices may contribute to the cost increase. At least in some cases, CDNs and edge servers might not be able to reach the last mile of the Internet.

Adaptive video streaming over HTTP may be utilized to deliver media content. Adaptive video formats may include, for example, dynamic adaptive streaming over HTTP (DASH). With adaptive streaming, multiple representations of the same content may be generated. A representation may be segmented into smaller chunks or segments. The chunks or segments may have different durations (e.g., between 2 to 10 seconds). When a streaming device (e.g., which may be a cache device, including an end-user device) requests media content from a server, the server may send a description of the media content (e.g., via a media presentation description (MPD) manifest file) to the streaming device. The MPD file may inform the streaming device about the bitrates of the requested media content, for example. The MPD file may provide universal resource links (URLs) for downloading the media content. The streaming device may request one or more video segments with a particular bitrate (e.g., a high or enhanced bitrate, a low or base rate, a medium rate, etc.). Based on the time it may take to receive a segment, the streaming device may assess various conditions (e.g., network and/or streaming device conditions), and may select the next segment according to the MPD and/or the assessed conditions. For example, the selection may be made upon consideration of quality requirements, network bandwidth, device capabilities and/or the like.

Figure 2:
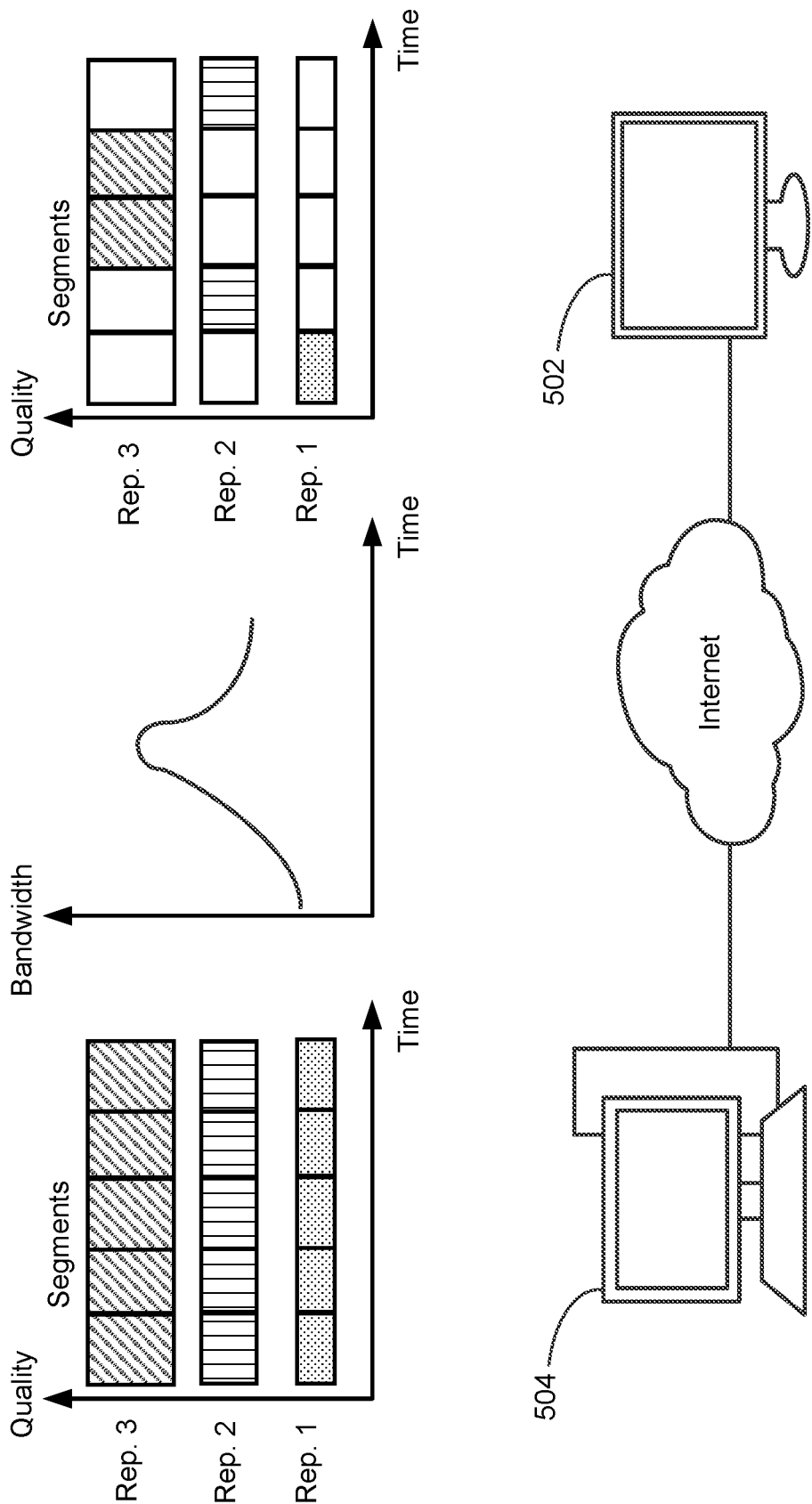
FIG. 2 shows an example of HTTP adaptive streaming.

FIG. 2 illustrates an example of HTTP-based adaptive streaming of media content. The media content may have been divided into multiple segments each coded into one or more representations (e.g., Rep. 1, Rep. 2, and Rep. 3) at different bitrates (e.g., Rep. 3 may have the highest quality, Rep. 2 may have a medium quality, and Rep. 1 may have the lowest quality). A streaming device (e.g., such as a smart TV 502) may request the media content from an origin server 504 over a network (e.g., such as the Internet). The streaming device 502 may request a specific representation of the media content based network conditions, the streaming device's capabilities, and/or various other conditions/factors. Higher quality representations of the media content (e.g., such as the Rep. 2 and Rep. 3 segments) may be requested and transmitted over the network when network bandwidth is sufficient. Lower quality representations of the media content (e.g., such as the Rep. 1 segments) may be requested and transmitted over the network when network bandwidth is low.

Table 1 shows example video stream files each containing the same media content coded at different bitrates.

TABLE 1

Example Video Stream Files Containing Video Content of Different Bitrates

| Video Playback Rate (kbps) | File Name |
|---|---|
| Desktop Client | |
| 235 | 15304768.imsv |
| 375 | 22630482.imsv |
| 560 | 20693663.ismv |
| 750 | 17864652.ismv |
| 1050 | 17091067.ismv |
| 1750 | 18266773.ismv |
| 2350 | 39219201.ismv |
| 3000 | 41121933.ismv |
| Smart-phone Client | |
| 110 | 14705760.imsv |
| 182 | 14986798.imsv |
| 257 | 15723334.ismv |
| 506 | 15411523.ismv |

The bitrate at which video content is encoded may affect distribution of the video content. Video codec may be used to compress a digital video signal. Through compression, resource requirements (e.g., storage and/or transmission bandwidth requirements) for distributing the video signal may be lowered. Table 2 shows example average speeds for streaming video content of different resolutions and/or coded with different video coding standards.

TABLE 2

Example Average Video Streaming Speeds Average Speeds

| Definition | Approximate Bitrate (Mb/s) |
|---|---|
| SD MPEG 2 | 4.0 |
| SD MPED 4 | 1.5 |
| HD MPEG 2 | 10.0 |
| HD MPEG 4 | 3.5 |
| UHD MPEG-4 | 28.0 |
| UHD HEVC | 15.0 |

High Efficiency Video Coding (HEVC) and/or its extensions may be used to code multiple video formats. The scalable video coding extension of HEVC (SHVC) may be used to code (e.g., via scalable coding) video content into multiple layers. The layers (e.g., a base layer (BL) and one or more enhancement layers (ELs)) may correspond to different representations of the video content. The layers may have different spatial resolutions, different temporal frame rates, different qualities, different color spaces, and/or the like. For example, a base layer representation may be coded at a base bitrate and an enhancement layer representation may be coded at an enhanced bitrate that is higher than the base bitrate. The enhancement layer representation may depend on the base layer representation for decoding and playback.

Figure 3:
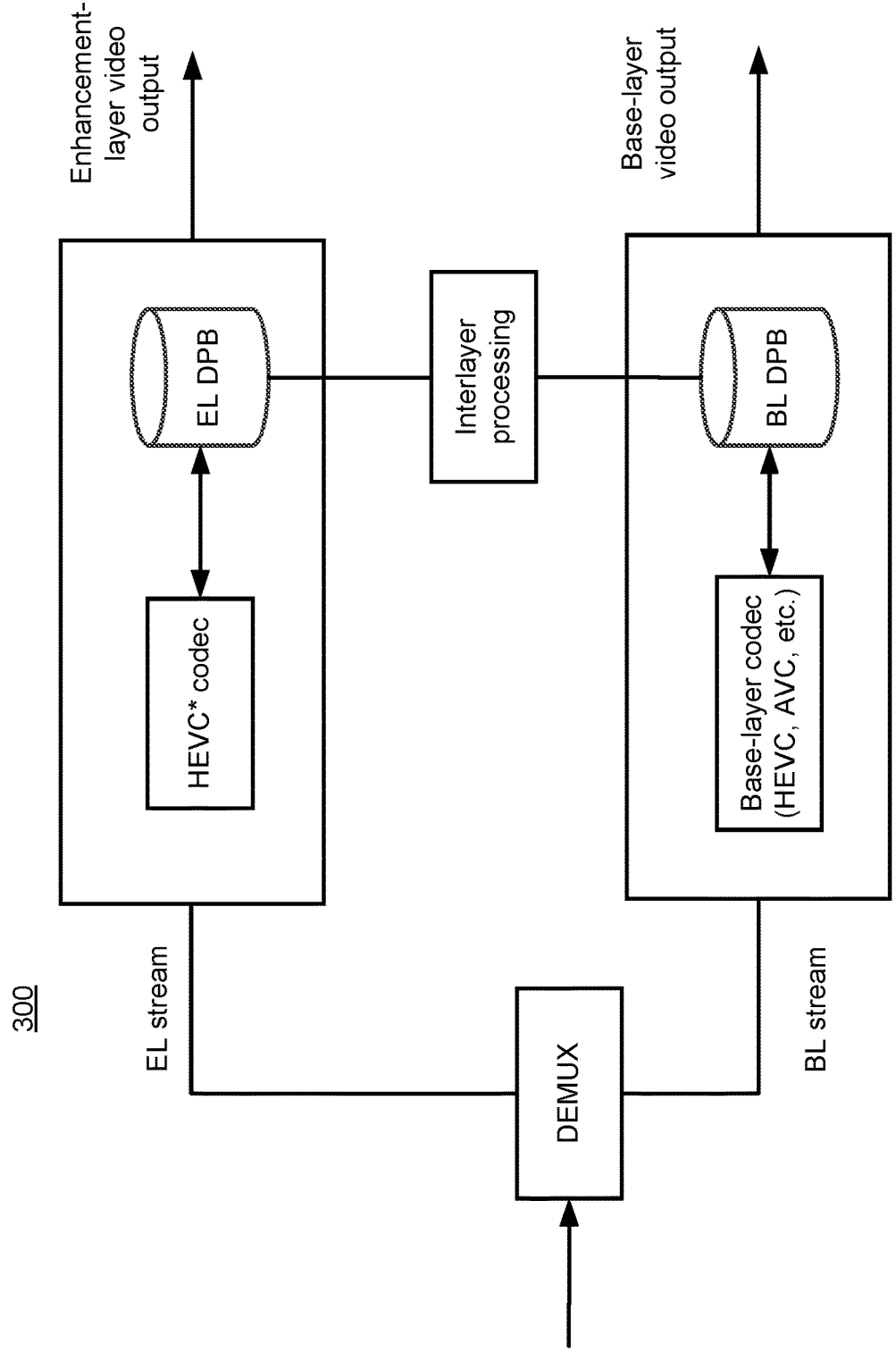
FIG. 3 shows an example decoder architecture for the scalable video coding extension of high efficiency video coding (SHVC).

FIG. 3 shows an example SHVC decoder architecture 300. An inter-layer reference picture may be used in SHVC as an additional reference picture to predict an enhancement layer representation. SHVC coding tools may be used at the slice level and above. One or more existing single layer HEVC implementations may be re-used in SHVC. Interlayer processing (e.g., as shown in FIG. 3) may include a resampling process for spatial and bit depth scalability, and/or a color mapping process for color gamut scalability (CGS).

The performance of SHVC may be evaluated, Table 3 shows example performance comparison between SHVC (e.g., for spatial and Signal-to-Noise-Ratio (SNR) scalability) and simulcast when two layers are coded independently. For random access, which is a coding configuration used in certain video entertainment applications, SHVC may achieve an overall rate reduction of 16.5% to 27% at the same peak signal-to-noise ratio (PSNR) when both base layer and enhancement layer bit rates are considered.

TABLE 3

SHVC Performance vs. Simulcast Performance

| Configuration | Anchor | 2× (%) | 1.5× (%) | SNR ( % ) |
|---|---|---|---|---|
| Random access | SHVC versus simulcast | 16.5 | 27.0 | 20.9 |
| | SHVC EL versus single-layer EL | 26.0 | 47.6 | 31.4 |
| Low delay | SHVC versus simulcast | 10.3 | 21.5 | 12.5 |
| | SHVC EL versus single-layer EL | 16.8 | 39.3 | 19.5 |

Scalable video coding may enable layered services to support the transmission and decoding of a partial bitstream. Different representations of the same content may be delivered to different devices based on their capabilities and reception conditions. Further, scalable streams may reduce the overall cost of storing a catalog (e.g., an entire catalog) in multiple titrates, and/or the amount of upstream traffic generated from keeping CDN and edge caching content up to date.

Figure 4:
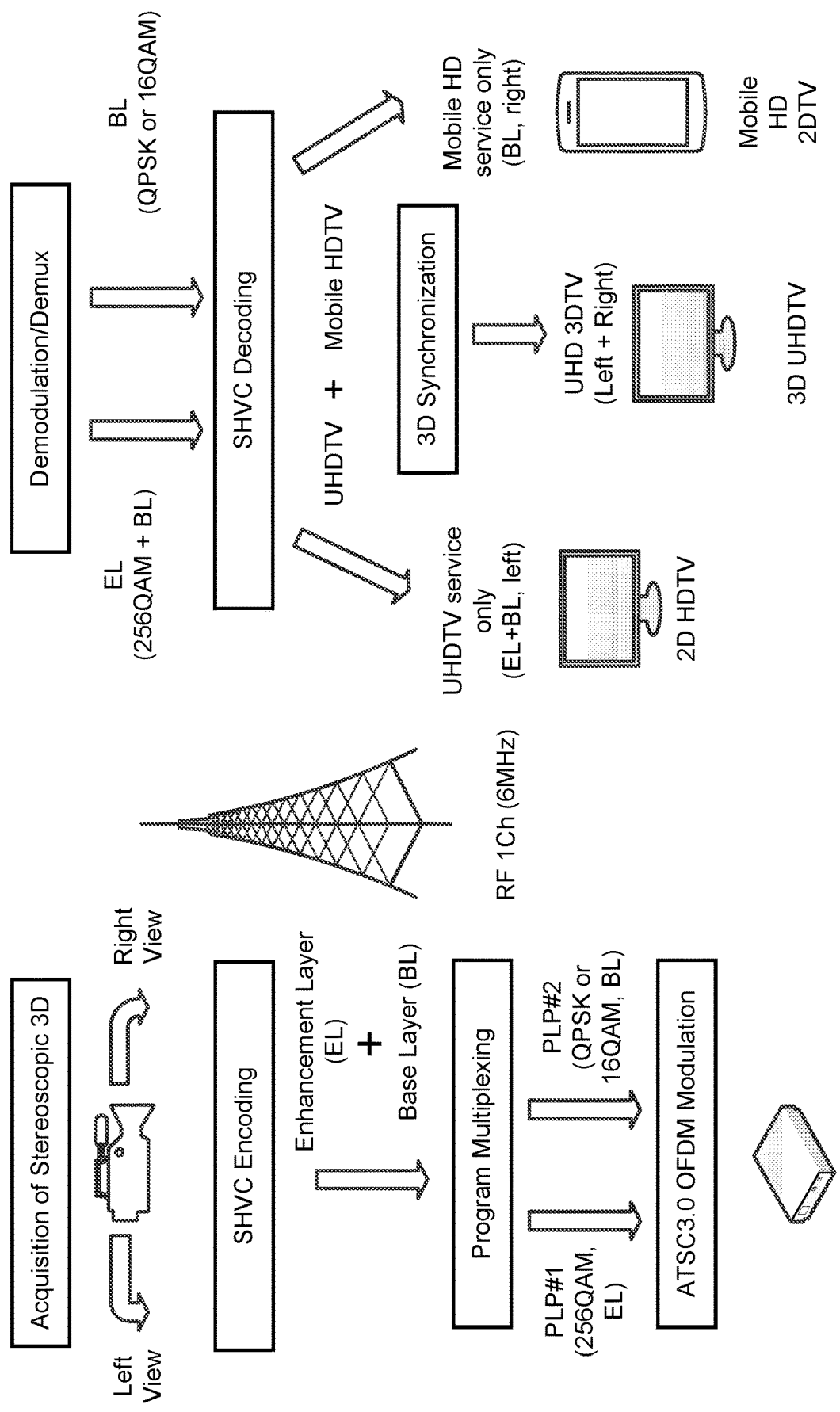
FIG. 4 shows an example hybrid 3DTV system.

FIG. 4 shows an example Hybrid 3DTV system (e.g., with SHVC service mode). The addition of SHVC service mode may enable service flexibility based on SHVC options. In the example, a high definition (HD) right view may be coded as a base layer. An ultra HD (UHD) left view may be coded as an enhancement layer, for example, with a conventional SHVC encoder. The base layer bitstream (e.g., HD right view) may be delivered (e.g., via QPSK or 16 QAM) to a mobile device (e.g., a mobile device that supports HD services). The enhancement layer UHD left view may be delivered (e.g., via 256 QAM) to a UHDTV (e.g., a UHDTV that supports 2D UHD services). The enhancement layer UHD left view may depend on the base layer for decoding and playing back. The synthesized right view and left view may be delivered to a UHD 3DTV. Such layered broadcasting of 2D and 3D content may support UHDTV, UHD 3DTV and/or mobile HDTV, e.g., within a RF channel.

Video coding standards beyond HEVC may aim at further compression efficiency (e.g., on top of HEVC). Another goal may be to alleviate network congestion in fixed and/or mobile networks. Various aspects of video formats, such as high resolution, high frame rate (HFR), high bit depths, high dynamic range, wide color gamut space and/or multiple views, may be considered. The quality of video content may reach a level closer to the capacities of the human vision. UHD formats may define parameters in multiple aspects of a video signal. For example, in addition to higher spatial resolutions of 4 k and 8 k image samples and/or higher frame rate of up to 120 HZ, the sample bit depths may be up to 12 bits to provide high dynamic range (HDR) support. A wider color gamut (WCG) may be used for the rendering of colors. Stereoscopic/multi-view or free-view video may become a relevant format. A scalable coding structure may be designed to support a diverse set of video formats. For example, a scalable coding architecture similar to that of the SHVC may be applied for coding standard development, with additional coding tools targeting different video formats.

Figure 5:
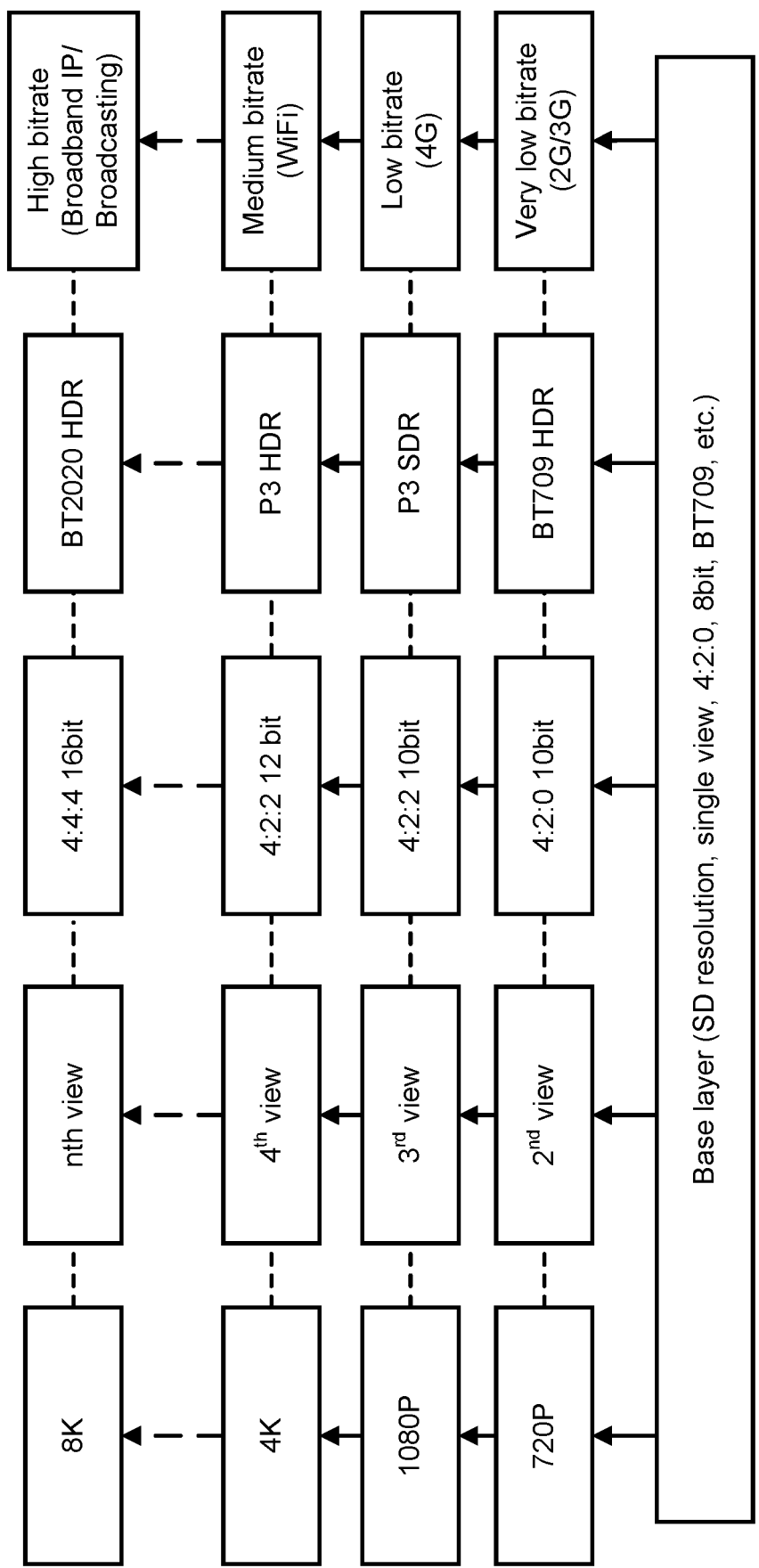
FIG. 5 shows an example of scalable video coding.

FIG. 5 shows an example of scalable video coding. Using scalable coding, media content may be coded into multiple formats including, for example, high resolution, high frame rate, multi-view, high bit-depth, high dynamic range (HDR), and/or wider color gamut (WCG). Each format may produce a unique viewing experience. Different mixtures of formats may be used to represent the video content at various bitrates. For example, a mixture of SD/30 fps/single view/4:2:0/8 bit/BT.709 may be used to represent the video content at low bitrates, a mixture of 1080 p/60 fps/single view/4:2:2/10 bit/p3/SDR may be used to represent the video content at medium bitrates, and a mixture of 4 k1120 fps/multi-view/4:2:2/12bit/BT2020/HDR may be used to represent the video content at high bitrates. Formats with enhanced viewing features (e.g., in different dimensions) may share a basic common format (e.g., SD/30 fps/single view/4:2:0/8bit/BT.709). Such a basic common format may be coded as a base layer.

With scalable video coding, a video format may be coded on top of a conventional video format. The correlation among multiple formats of the same content may be explored during scalable coding. A layered coding structure may be used. A single scalable bitstream of a catalog may be stored on a content server (e.g., which may be an example of a content source referred to herein). Different layers of the scalable bitstream may be extracted (e.g., be extracted as the bitstream is being requested or retrieved). The extracted layers may be delivered to multiple connected devices, for example, during an adaptive streaming session. The connected devices may have different capabilities and/or service subscriptions.

With scalable coding techniques, adaptive streaming of video content may be possible. Different layers of the video content may have different random access frequencies. Various techniques may be used to speed up adaptation and/or to reduce re-buffering. Examples of these techniques may include fast tune-in, fast switch-up, and/or fast switch-down.

As content servers and/or storage resources are centralized in large Internet exchanges and/or data centers, the edge of the Internet may expand and more traffic may originate from edge caches instead from large data centers. Pushing content to connected devices may reduce the traffic between edge caches and end users. As described herein, next generation video coding standard may support multiple video formats. A wide range of enhanced video content may be covered. Efficient compression techniques may become available. Multiple copies of the same video content (e.g., copies of different resolutions, bitrates, and/or enhancement features) may be stored on edge servers. The copies may be used by the edge servers to fulfill client requests based on the client's capabilities, network conditions, subscription plans, and/or other factors. Enhanced video features, such as high resolution, high frame rate, high hit-depth, and/or the like, may increase the number of copies (e.g., copies of the same or different content) of video streams that need to be stored on a CDN or edge server. Operational cost for service providers may increase.

When the same video content is coded into multiple representations at different bitrates and/or with different video formats (e.g., in a hierarchical CDN topology), high bitrate video segments may be stored on a remote server while low bitrate video segments may be stored in an edge cache. When a streaming device requests particular video content, some segments of the content may be provided directly from the edge cache to the streaming device. The streaming device may assess a network condition (e.g., connection speed between the edge cache and the streaming device) based on how the requested video content are being delivered. If the connection speed is sufficient, the streaming device may request more high-bitrate segments. Such high-bitrate segments may be stored on a remote server and may be delivered from that server directly. When the connection speed between the remote server and the streaming device becomes insufficient, the streaming device may request a reduced bitrate representation of the content, and may be directed back to the edge cache to retrieve the representation. As such, the streaming device may engage in a process in which the streaming device may switch between an edge cache and a remote server to retrieve video segments of different qualities.

With scalable video coding, a streaming device may be able to receive lower resolution content (e.g., one or more base layer segments) consistently since such content may be retrieved from an edge cache (e.g., even if network speed is low). As more network bandwidth becomes available, the streaming device may request higher resolution content (e.g., one or more enhancement layer segments) from a server while still receiving base layer segments from the edge cache. When connection speed between the server and the streaming device becomes insufficient, the streaming device may cease retrieving enhancement layer segments from the server, and may still retrieve base layer segments from the edge cache. This way, the streaming device may avoid having to switch between the server and the edge cache under fluctuating network conditions.

Scalable video coding techniques may keep infrastructure costs (e.g., costs associated with edge servers) under control. Streaming features that may be enabled by scalable video coding, such as quick bandwidth adaptation and re-buffering time reduction, may improve consumer experience on various devices. Video consumption may be driven higher.

Figure 6:
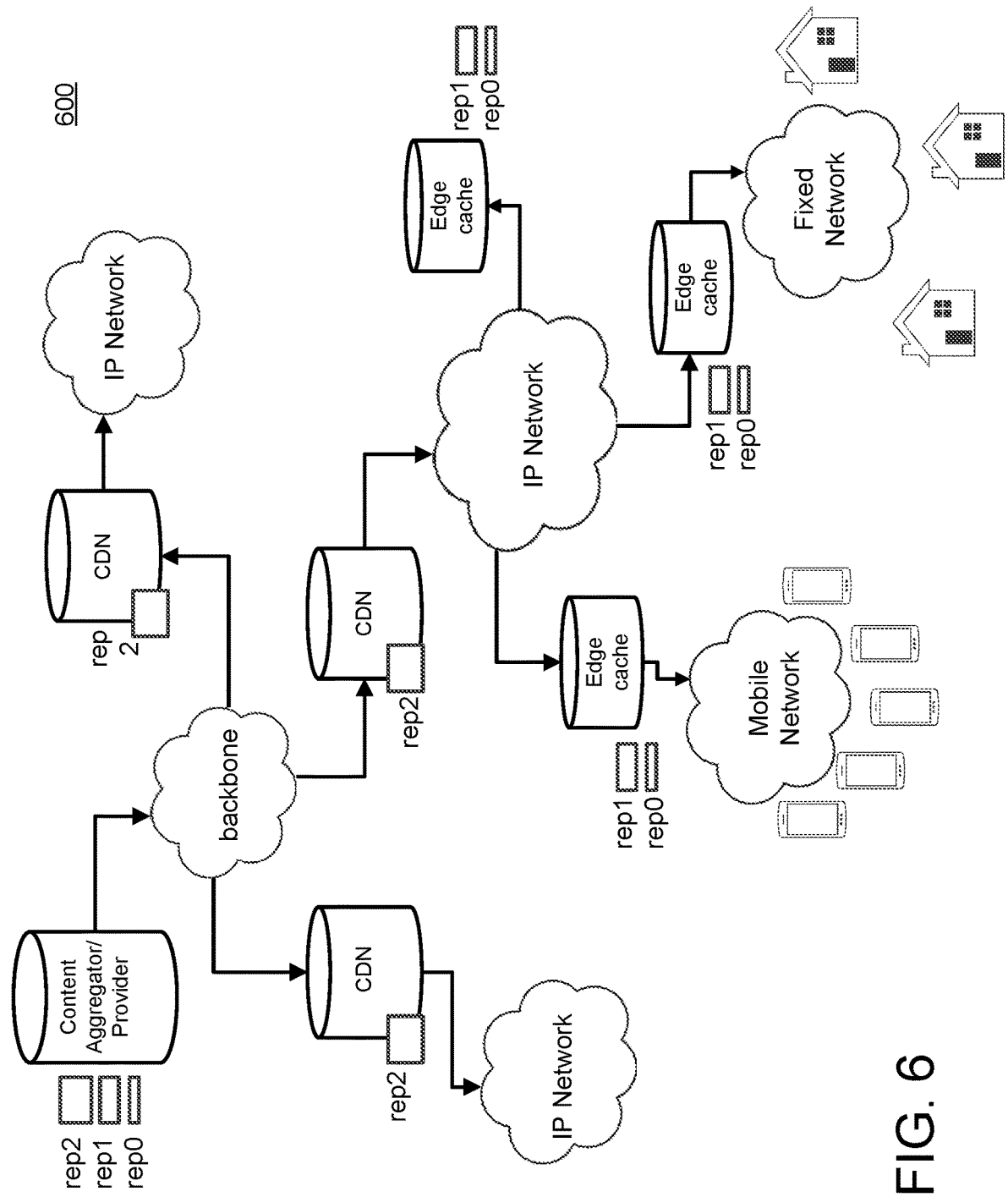
FIG. 6 shows an example CDN video distribution system.

FIG. 6 shows an example of a hierarchical CDN 600. A content provider or aggregator may distribute and/or replicate media content onto the hierarchical CDN 600 (e.g., via broadcast and/or multicast from a content source). The content may be coded into multiple representations (e.g., rep1, rep2, and rep3) with different qualities. Copies of the content may be replicated to one or more edge cache servers. The edge cache servers may serve their content to end users (e.g., via video on-demand). The service may be provided via unicast or broadcast, for example. The service may be carried over a fixed network to a home, a wireless network to mobile devices, or a combination of fixed and mobile networks.

Commonly shared lower resolution video content (e.g., such as qHD (960×540) resolution videos coded at 256 kbps) may be cached at locations close to an end user. Such locations may be within a home network, such as a home gateway and/or an end user device (e.g., the location may be local storage space on a WTRU, as described herein). Caching at these locations may be possible because the low resolution content may be accommodated with limited storage space and/or may be compatible with a wide range of end user devices (e.g., the end user devices may include computers, TVs, or WTRUs as described herein). Medium resolution content, such as 1080 p resolution enhancement layer streams coded at a medium bitrate, may be moved to a CDN or edge servers that serve metropolitan areas. High resolution content, such as 1080 P or 4K enhancement layer streams coded at a high bitrate, may be distributed based on factors that may affect the distribution (e.g., the number of premium subscribers and/or their locations).

Figure 7:
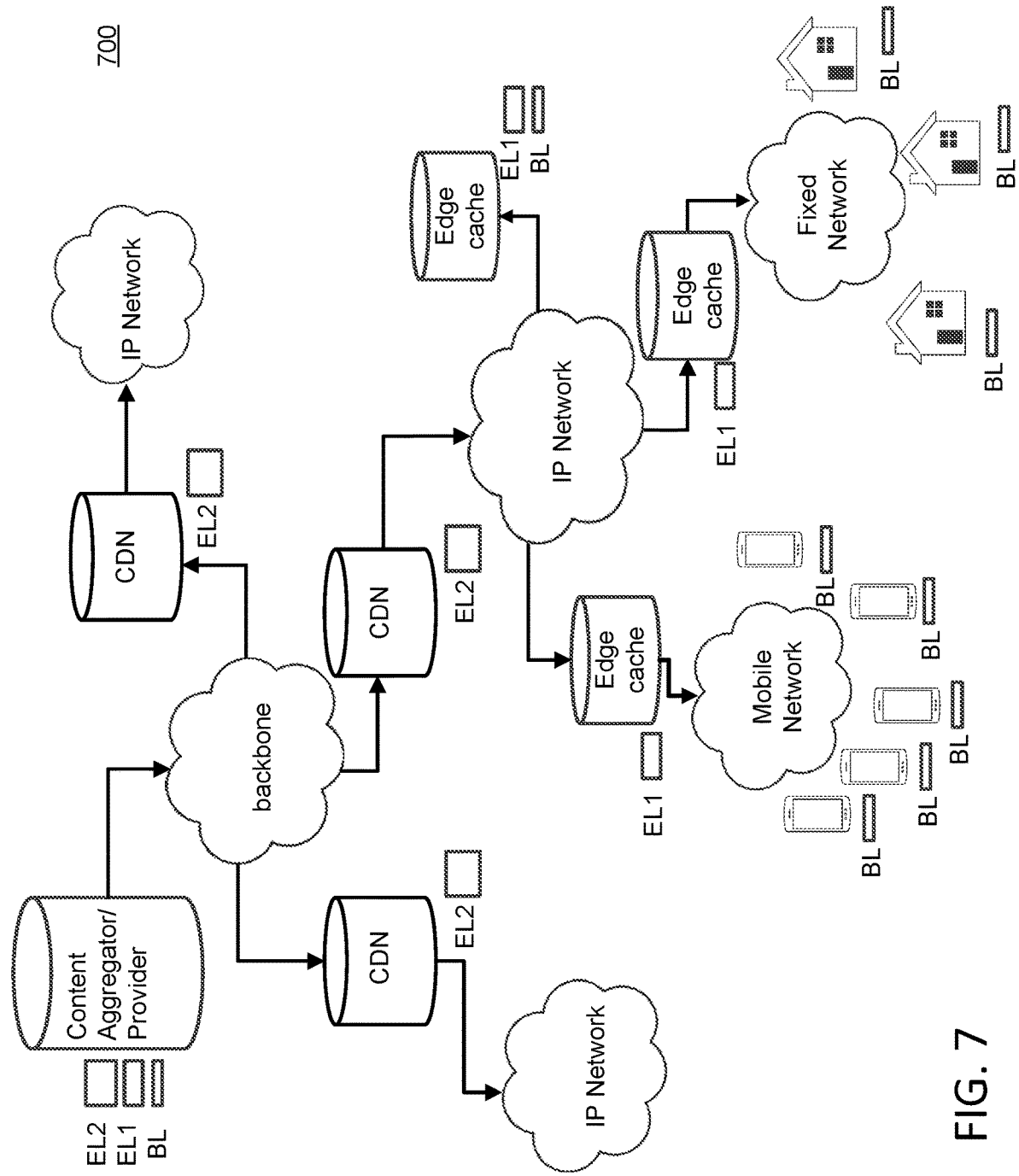
FIG. 7 shows an example scalable coding based content distribution system.

FIG. 7 shows an example scalable coding based content distribution system 700. Different representations of scalable video content may be distributed across the system 700 in a hierarchical manner. The video content may include one more content objects (e.g., TV shows, movies, video clips, etc.). Each content object may be coded into multiple representations of different qualities. For example, a first representation of a content object may be a based layer (BL) representation coded at a base bitrate, a second representation of the content object may be an enhancement layer (ELl) representation coded at a medium bitrate that is higher than the base bitrate, and a third representation of the content object may be another enhancement layer (ELl) representation coded at a high bitrate that is higher than the medium bitrate. The content distribution system 700 may include a content server (e.g., which may an example of a content source referred to herein) on which the video content may originally reside. The content server may belong to a content provider or aggregator, for example. The content distribution system 700 may include one or more CDN servers, which may be connected to the content server through a backbone network. The content distribution system 700 may include one or more edge cache devices located at the edges of IP networks. The edge cache devices may be connected to the CDN servers via the IP networks. The edge cache devices may be accessible to home devices (e.g., via a fixed network) or to mobile devices (e.g., via a mobile network).

A determination may be made (e.g., by a cache controller) to map the video content to the various devices in the content distribution system 700 (e.g., to decide which content objects and/or representations should be cached on which devices, including end user devices and home gateways). Various considerations may be taken into account in the determination, including, for example, an end user device's storage capacity or the likelihood that certain cached content may not be watched (e.g., which may result in storage and/or network bandwidth waste). Since content cached on an end user device or a home gateway may serve a group of end users (e.g., end users associated with or served by the end user device or home gateway), the content may be selected and/or personalized for the group of end users.

A caching strategy for scalable media content may be set according to the content preference (e.g., which may be reflected through or derived from viewing habits, viewing history, and/or service subscription) of an end user. The content preference of the end user may be associated with a device of the end user. The content preference may be related to the end user's gender, age, religion, education, culture background, and/or various other characteristics. Content consumption analysis may be performed to determine which video programs should be cached. The caching strategy may take into account the end user's viewing history. The caching strategy may be based on the end user's time zone and/or location. Based on these and other user information, the media content to be cached on an end user device or a home gateway, and/or the time to download the media content may be determined. For example, a controller (e.g., which may comprise software programs and/or hardware components) may be provided for determining which content should be cached. The controller may reside on a device within a home network (e.g., on an end user device, a home gateway, etc.) and/or a network entity outside the home network (e.g., such as a CDN server or a content server, which may connected via the Internet). The controller may monitor or may be provided with the viewing history of one or more end users associated with the end user device, the home gateway, and/or the network entity. Based on the viewing history, the controller may predictively select media content for local caching. For example, if a particular end user device frequently watches the latest episodes of a particular news show or a television series (e.g., within a certain time frame of the initial release of such episodes), the controller may monitor those programs for new episodes. When a new episode is detected, the controller may request that the content of the new episode be cached on the end user device. The controller may request a specific representation of the content (e.g., the controller may request that base layer segments of the content be cached on the end user device, or that enhancement layer segments of the content be cached on the end user device).

A home gateway may be associated with a group of end user devices. The controller described herein may monitor what media content is selected for viewing by the group of end user devices and/or what content is served to such end user devices through the home gateway. The controller may monitor the viewing history (e.g., the aggregate viewing history) of the group of end user devices associated with the home gateway. For example, if the controller determines that the latest three episodes of a particular TV show have been commonly requested and/or played by the group of end user devices, the controller may request that media content for the latest three episodes of the TV show be cached in the home gateway. For example, the controller may request that one or more scalable base layer segments of the media content be cached in the home gateway, or that one or more scalable enhancement layer segments of the media content be cached in the home gateway. The controller may monitor the TV show for new episodes. The controller may manage the available cache storage on the home gateway. For example, older episodes of the TV show may be deleted when storage room runs low (e.g., falling below a threshold). New episodes may be requested and/or cached when more storage room becomes available.

The controller described herein may adaptively determine whether to cache media content on an end user device or on a home gateway. The determination may be made based on various factors. For example, the determination may be made based on whether the media content in question is historically watched on a single device or across multiple devices served by a common home gateway. In the former case, the software may request that the media content be cached on the single device. In the latter case, the software may request that the media content be cached in the home gateway. The storage available within the home network may be managed so that content may be placed where it is likely to be viewed.

The controller described herein may select or personalize a portion of an existing edge cache or CDN outside a home network. The selected or personalized portion may be used as a dedicated cache for a particular end user. The dedicated cache capacity may be expanded to store more programs. Content replication may be carried out locally without delivery to the end user. For example, the content replication may occur inside the edge cache or CDN. The personalized cache may be physically allocated or may be virtually mapped to existing cache.

Other factors such as explicitly provided consumer preferences or knowledge about the consumer (e.g., such as age, gender, religion, educational level, or cultural background) may be considered by the controller.

Different servers may be dedicated to store different representations of media content. The representations may have different characteristics including format, resolution, etc. For example, an edge cache server may be configured to store base layer content shared by multiple end users. A first group of CDN middle servers (e.g., located between the edge cache server and the origin content server) may store enhancement layer content with higher spatial resolution. A second group of CDN middle servers may be configured to store enhancement layer content with multi-view. A third group of CDN middle servers may be configured to store enhancement layer content with wider color gamut.

As shown in FIG. 7, layered media content may be cached on home gateways or end user devices. The scalable media content may be distributed to those cache devices (e.g., the home gateways and/or end user devices) over a network (e.g., an existing coaxial cable network, a broadband IP network, a wireless network, etc.). The content may be distributed using multicast or broadcast. The cache devices may support content sharing among end users of a same local network such as a home network. Content exchange among the cache devices (e.g., among home gateways and/or end user devices) may utilize multicast, unicast, peer-to-peer (P2P) delivery (e.g., between a home gateway and an end user device, or between end user devices), and/or the like. The sharing/exchange may allow CDNs to offload data traffic from last mile connections to home networks. The offloading may occur during off peak hours to alleviate network congestion.

Figure 8:
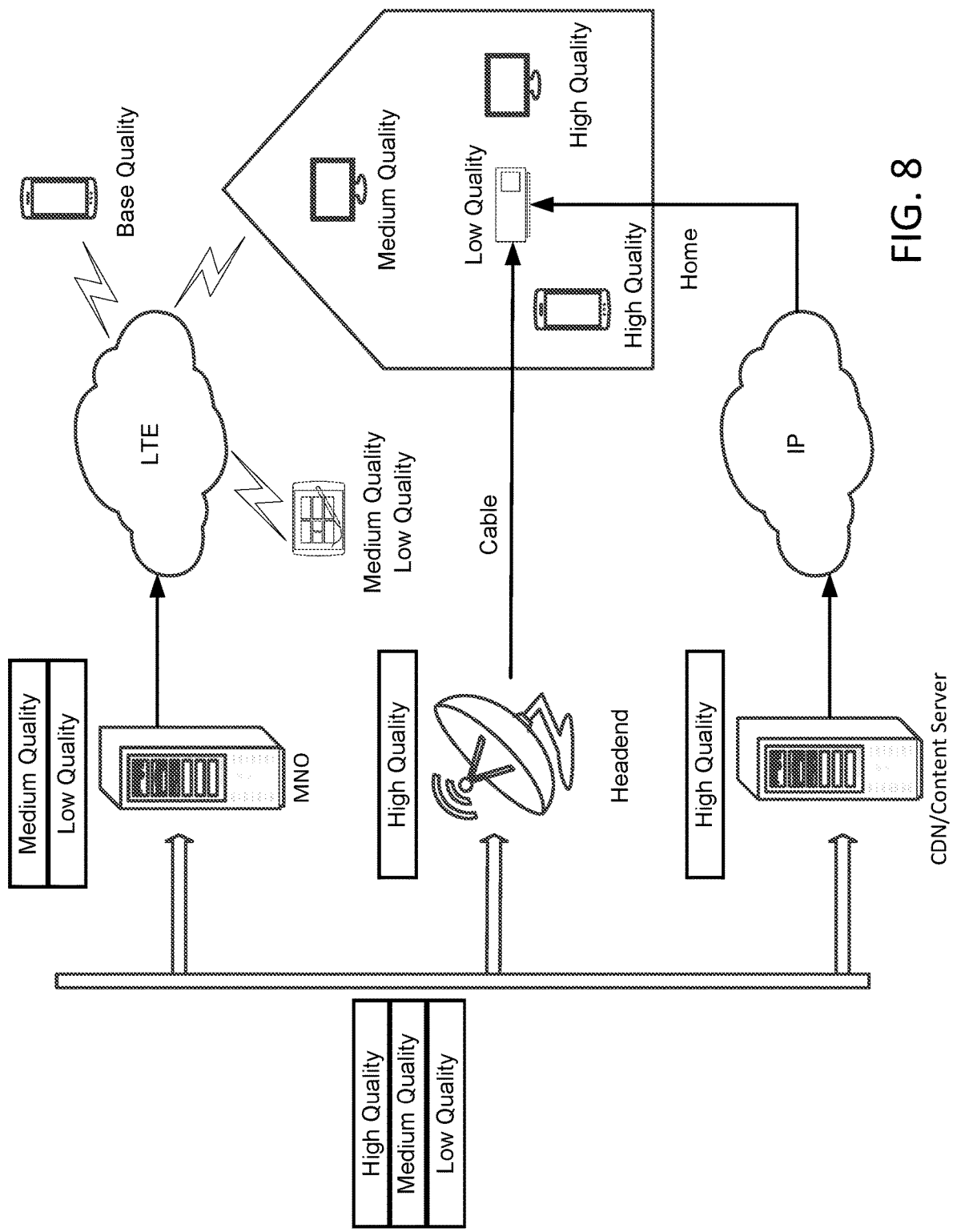
FIG. 8 shows an example scheme for scalable coding based content caching.

FIG. 8 shows an example scalable coding content caching scheme. Media content may be coded into one or more representations (e.g., the representations may have different resolutions and/or formats, as described herein). The representations may include a base layer representation (e.g., of low quality) and one or more enhancement layer representations (e.g., of medium and high qualities). The representations may be distributed from a cable headend, a MNO, a CDN server, and/or the like.

The base layer representation and/or the one or more enhancement layer representations may be cached on devices located near an end user. These devices may include, for example, devices located within a home network such as an end user device (e.g., a WTRU described herein), and/or a home gateway. Multicast or broadcast may be utilized to distribute the content to the devices. The multicast/broadcast distribution may occur during off-peak hours (e.g., late night to dawn). The caching scheme may facilitate uninterrupted viewing from time-shifted video applications such as indoor streaming, on-the-road viewing (e.g., via a wireless connection), etc.

In addition to or in lieu of storing the base layer representation on a local device, the base layer representation may be stored on an edge cache server and be delivered to one or more end user devices at viewing time. Media content may be accessed this way without being replicated (e.g., without being replicated to multiple cache devices). For consumers subscribing to high fidelity services, the enhancement layer representation cached in a home gateway and/or an end user device (e.g., during off-peak time) may depend on a corresponding base layer representation for decoding and/or playback (e.g., the enhancement representation may not be decoded and displayed until it is added on top of the base layer representation). As such, content protection may be accomplished via the caching scheme described herein. A controller may receive information/communication regarding the copyrights of certain media content, and selectively cache the base layer and enhancement layer representations of the media content so that unauthorized use of the media content may be prevented. For example, caching of base layer and enhancement layer representations of media content may be arranged so that an unauthorized user having access to locally cached enhancement layer representations may not be able to play back the media content without also having access to the base layer representation of the media content. The base layer representation may be cached in the network, and access to the base layer representation may require authentication, for example. The content protection techniques described herein may be used in addition to or in lieu of other forms of content protection such as encryption or content scrambling.

End users may pre-load media content (e.g., for road trips or offline viewing). With scalable coding, a cache controller may select a number of layers to deliver to a local cache ahead of the viewing time based on network conditions (e.g., available bandwidth), estimated offline time, and/or other device- or user-related information. This may be illustrated in the example below.

Media content (e.g., a content object) may be coded into multiple segments each having one or more layers. The layered media content may be delivered (e.g., sequentially delivered) from a server to an end user device based on the condition specified in (1) below. In (1), $S_{ij}$ may represent the size of a j-th segment of an i-th layer media stream, T may represent the estimated time an end user device will remain connected with a home network, and BW may represent the average download bandwidth of the network (e.g., which may be a Wi-Fi network or a broadband network). According to (1), m segments of n layers of the content may be delivered if the total size of those segments/layers is less than or equal to the total amount of bandwidth available within the time period T (e.g., represented by BW*T). After the delivery, the end user may have at least the base layer content pre-loaded, and may play back the media content later without a network connection.

$$\Sigma_{i=0}^{n}\Sigma_{j=0}^{m}S_{i,j} \leq BW*T \qquad (1)$$

If a second network is available (e.g., a 3G/4G wireless network) for real-time streaming, enhancement layer content may be delivered via the second network to provide high quality video presentation to the end user.

As described herein, home gateways and/or local devices may provide an overlay network on top of a content delivery network. A layer-based and/or collaborative caching strategy may off-load network traffic, e.g., by leveraging local storage and/or upload capacities. Resource usage at the network and/or streaming devices may be configured to control the overall storage/distribution cost and/or to improve performance throughout the network (e.g., in the last mile of the network). Various algorithms may be used (e.g., a "push" strategy may be implemented, as described herein) to place content among local storage devices. Future requests from end users may be predicted by analyzing the users' viewing habits and/or other personal traits.

Media content demanded by a mass audience may be delivered using a mobile network such as a LTE network. The mobile network may allow operators (MNOs) to offer different services based on the service type (e.g., live or non-real time), location (e.g., venue-specific, local, regional, or national), quality (e.g., bitrate, QoS), time, and/or various other factors. Scalable base layer content may be pushed to mobile devices via LTE broadcast (e.g., during off-peak hours to offload streaming traffic). For example, with high viewership movies, TV programs, and/or live events, LTE broadcast may be used to deliver base layer single-view, low frame rate, and/or standard dynamic range content. Enhanced features such as multi-view, HDR and or WCG enhancement content may be delivered (e.g. In the form of one or more enhancement layers) via unicast.

Subscribers may act as hosts and offer local cache space (e.g., local gateways or routers with storage capability) to share with devices in the surrounding area. Authorization from the hosts may be required to access the shared cache. For example, a school or library may serve as a host and cache local news or public programs on its gateways. Authorized students of the school and/or patrons of the library may fetch the cached content from the school or library's gateways (e.g., as opposed to streaming the content from a CDN or edge servers). The fetching may be performed via device-to-device or peer-to-peer communication, for example. As another example, relatives and friends of a host user who live close to the host user and/or who share the host user's viewing interests may request and obtain permission from the host user to stream content from a device or gateway of the host user that has been dedicated as shared local cache.

Base layer content may be delivered via broadcast or multicast. In such cases, the base layer content might not be provided via on-demand services. TV programs such as news reports and weather forecasts may become outdated quickly (e.g., losing their popularity when a more recent report or forecast becomes available). Thus, it may not be cost-effective to deliver these types of TV programs to on-demand customers via unicast, or to frequently replicate newly released content of the programs on edge servers for time-shifted viewing. Rather, the programs may be pushed to local cache (e.g., via LTE broadcast). Cache replacement policies may be employed to manage the local cache. For example, the policies may be used to determine what content should be replaced when the local cache becomes full. Cache replacement policies such as Least Recently Used (LRU) and/or Least Frequently Used (LFU) may be used to schedule the replacement of locally cached content. A storage area allocated to cache a certain program may be periodically updated with new content. If a first viewer requests a scheduled program and a second viewer in a neighboring area is already watching the program and/or has cached the program on a local device, the first viewer may stream the program directly from the second viewer's local device.

Figure 9:
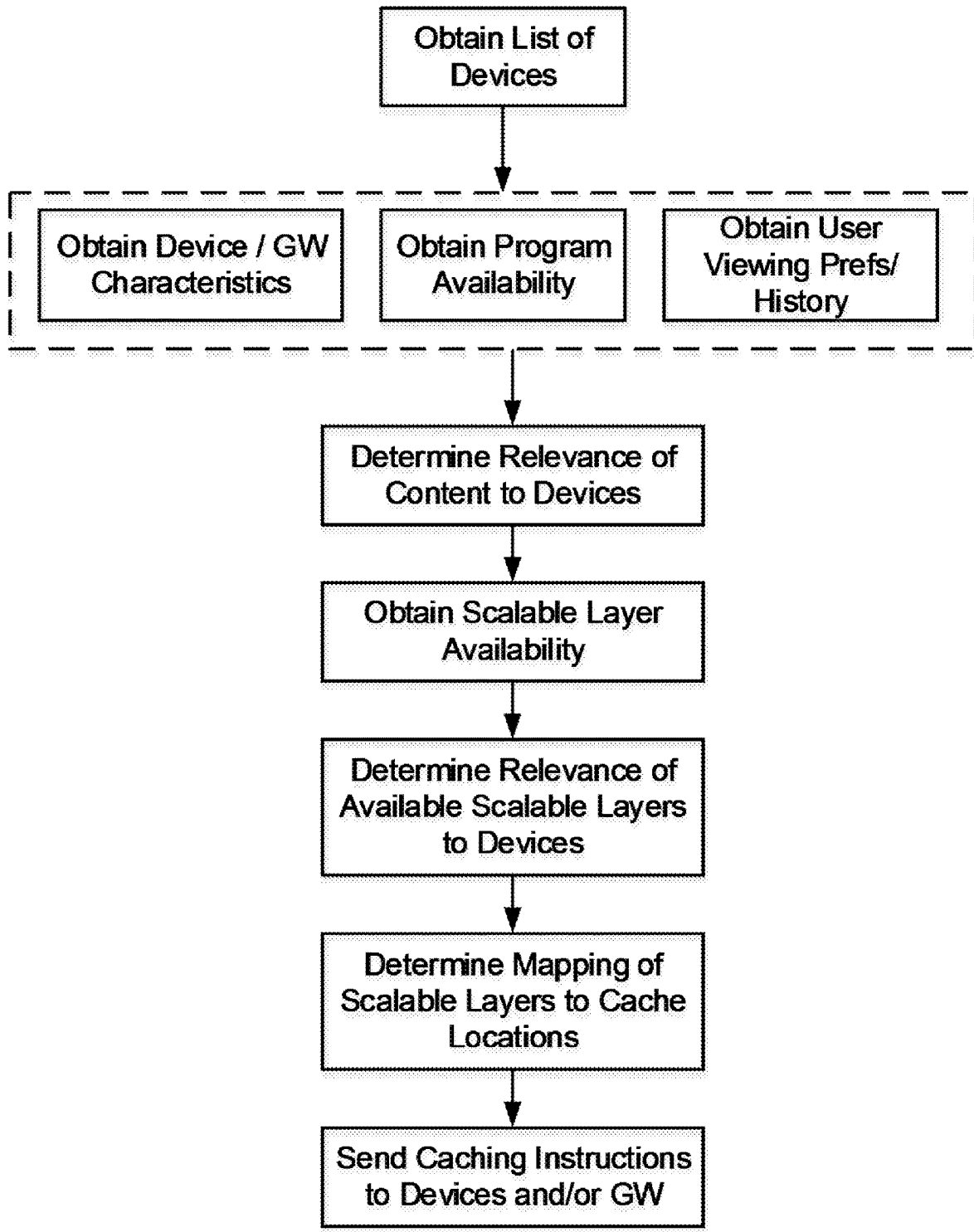
FIG. 9 shows an example of intelligent cache control.

FIG. 9 shows an example of intelligent cache control. The control may be exercised by an intelligent cache controller to allocate different scalable layers of the same or different content objects on different cache devices. The cache devices may include end user devices such as mobile phones, tablets, network connected televisions, set top boxes, media player devices, gaining consoles, portable gaining devices, personal computers, and/or the like. The cache devices may include other types of WTRUs as described herein. The devices may be capable of playing scalable media content and/or storing the scalable media content. In some cases (e.g., a degenerate case), an end user device may be capable of playing non-scalable media content (e.g., only non-scalable media content) and/or storing the non-scalable media content.

The cache controller may control caching in a mixture of end user devices. Some of these end user devices may support playback of scalable media content. Some of these end user devices may support playback of non-scalable media content (e.g., only non-scalable media content). Some of these end user devices may be cache-only devices that do not decode and play media (e.g., such as a home gateway). Some of these end user devices may be capable of receiving media content via a home network. For example, the media content may be received (e.g., for caching and/or for real-time playback) via a home gateway.

The cache controller may control caching in devices outside a home network (e.g., in CDN cache and/or edge cache). The cache controller may have knowledge (e.g., may acquire knowledge) of content objects and/or scalable layers of the content objects that may be available (e.g., on the outside caching devices). The cache controller may use such knowledge to decide which content objects and/or scalable layers should be cached on which devices (e.g., within a home network or a CDN). The cache controller may direct a home network device to a nearby outside cache when instructing the home network device to download media content. For example, the cache controller may direct the home network device to a neighboring outside cache if certain content objects or specific scalable layers of the content objects are available in that outside cache.

As illustrated in FIG. 9, the cache controller may obtain a list of devices for caching purposes. The list of devices may include devices available in a home network. The list of devices may include end user devices. For example, the list of devices may include devices capable of decoding and playing media content, and/or caching media content (e.g., capable of caching one or more scalable layers of one or more content objects). The list of devices may include a home gateway with caching capabilities. The list of devices may include devices such as routers, or media storage/media server devices with caching abilities and/or accessible to other end user devices in the home network. More generally, the list of devices may include a device that is capable of caching media content and/or that is capable of decoding and playing media content.

The list of devices may be derived in various ways. In an example, a device discovery protocol such as Universal Plug and Play (UPnP) may be used to discover the devices in a home network. The cache controller and/or a central device such as a home gateway or media server that is not acting as the cache controller) in the home network may broadcast a signal into the home network asking devices to respond and identify themselves. In an example, the list of devices may be discovered through a semi-automatic or manual registration process. The registration process may be initiated by a user or owner of the home network. In an example implementation, a device discovery procedure may be carried out to identify potential devices. A user may choose (e.g., through a user interface) which devices are allowed to cache content under the direction of the cache controller. The user may install a client application or other suitable software on devices that may participate in the aforementioned controlled caching system. The client application may register with the cache controller, which may reside locally on a home device (e.g., on a home gateway), or outside the home network (e.g., on the Internet or another network as described herein). The client application may communicate with the cache controller to, for example, receive and execute caching instructions transmitted by the cache controller. The instructions may specify, for example, the time and location at which the cache devices may retrieve media content, and/or the specific content objects to be retrieved.

The list of devices may be constructed by the cache controller. The list of device may be constructed by another device and then communicated (e.g., at once or in pieces) to the cache controller. In an example, a home gateway or a media server in the home network may use a device discovery protocol within the home network to determine what devices are available in the home network, and the home gateway or media server may communicate this information (e.g., as a list of such devices) to the cache controller (e.g., a cache controller residing outside the home network).

The cache controller may obtain device characteristics and/or device property information (e.g., capability information) for the various devices on the device list. In an example, a device (e.g., an end user device or another device with caching capabilities) may send property information (e.g., capability information) to the cache controller. The property information (e.g., capability information) may include, for example, caching capability, total storage size (e.g., cache size), the size of currently available cache space, types of scalable layer the device is capable of decoding, types of scalable layer the device is willing to cache, information about supported codecs on the device, profiles and/or levels which the device is capable of decoding and/or using, a maximum display resolution supportable by the device, a mobility type (e.g., whether the device is mobile or fixed), a list of network connection types and/or connection speeds the device is capable of supporting, statistics on how often the device is available in the home network, and/or the like. In certain scenarios (e.g., when the cache device is a home gateway), the property information (e.g., capability information) may include an indication of which devices (e.g., which end user devices) can access content from the cache device, an indication of whether or how often such devices have accessed content from the cache device in the past, and/or an indication of how often the cache device has detected the other devices in the home network. Capability information and other device characteristics may be identified using a signaling protocol (e.g., an explicit signaling protocol). Some device characteristics may be inferred based on an identifier of the device—for example, a model number of a smart TV may be reported or identified, and fixed characteristics (e.g., supported codecs/profiles levels, display resolution, and other characteristics tied to that model number) may be inferred by the cache controller, e.g., using a database that maps device identifiers such as model numbers to characteristics of the identified devices.

The cache controller may monitor and/or obtain program availability (e.g., from a content source, which may be associated with a content provider). Program availability may indicate what programs (e.g., media objects representing shows, episodes, shorts, movies, news casts, etc.) are available and may be requested, retrieved, and/or played by devices in a home network. The program availability may take the form of a program guide, for example. The program guide may indicate metadata for an available program. The metadata may indicate, for example, a program title, program description, coding formats, quality matrix, searchable tags and/or classifiers that describe the content of the program, a series relationship wherein multiple programs may form episodes in a series, a location from which the program or a manifest for the program may be retrieved, and/or the like. The program availability information may be updated periodically, for example, as new programs become available and/or as older programs become unavailable. The cache controller may, for example, monitor and/or request program availability updates from the one or more content sources (e.g., which may be associated with one or more content providers) via network requests (e.g., HTTP or other suitable protocol).

The cache controller may obtain an end user's content preference (e.g., which may be reflected through or derived from the end user's viewing habits, viewing history, and/or service subscription). Such information may indicate programs, program series, types of the programs (e.g., metadata tags or classifiers descriptive of such program types) that the user has viewed in the past, or which the user has indicated a desire to view in the future, and/or the like. The content preference may include programs the user has specifically placed in a queue or flagged to watch later. The content preference may include one or more recommendations from a content provider, which the content provider may be displaying or planning to display to the user (e.g., "These titles are recommended for you" or "These titles are related to Movie X"). The content preference may indicate to the cache controller a number of programs or series of programs that the user is likely to watch in the future, or that the user would have easy access to play within a user interface (UI) (e.g., an UI displayed by the content provider).

The content preference described herein may be specific to an end user and/or associated with a specific device (e.g., an end user device on which media content is watched, possibly by more than one user). The content preference may indicate a correspondence between the previously viewed, preferred, recommended or queued content and the user and/or device to which such content is relevant. The content preferences may indicate which users typically watch content on which devices.

The content preference described herein may be obtained from end user devices. For example, an end user device may track what content is watched on the device, what content series are watched on the device, what types of content are typically watched on the device, what specific preferences the user has indicated (e.g., in an explicit survey, or via rating content after viewing), and/or the like. The end user device may report such information to the cache controller, e.g., directly or via an intermediate device such as a home gateway. The content preference described herein may be provided by (e.g., obtained from) a content service that tracks content watched by certain users or on certain devices. For example, a content streaming service may track what content, content series, or types of content are watched by a particular user (or within a user profile) or on a particular device. The content service may track specific preferences the user has indicated (e.g., in an explicit survey, or via rating content after viewing). The content service may provide such information to the cache controller. The cache controller may use such information to make caching decisions for the various devices.

The cache controller may determine the relevance of available content objects to various devices (e.g., cache devices, including devices with viewing capabilities). For example, the cache controller may determine (e.g., based on content preference associated with an end user and/or an end user device) which content objects are likely to be relevant to an end user device within a time period. This may be illustrated by the following examples. If a user habitually watches new episodes of a series on a particular tablet device, the cache controller may determine that new episodes of the series may be relevant to the tablet device. If a particular mobile phone and an HDTV are both seen to be used to watch a particular financial news program, the cache controller may determine that the latest episode of the financial news program may be relevant to both the mobile phone and the HDTV. If movies placed in the "watch later" queue of a particular content service are frequently viewed using a particular UHD television, the cache controller may determine that the movies in the "watch later" queue may be relevant to the UHD television. More generally, the cache controller may determine the relevance of available content objects to users and/or devices. The cache controller may identify a relative importance of such content for the users and/or devices. Importance may be judged based on a number of criteria including, for example, the frequency of viewing a particular show or content type in the past on a given device, a relative rating of the show or content type which a user has given after watching such content in the past, a position within the "watch later" queue, and/or the like.

The cache controller may determine the availability of media content (e.g., which scalable layers and/or scalable layer types are available for a content object). For example, the cache controller may determine which scalable layers and/or scalable layer types are available for a content object that is relevant to a streaming device. The cache controller may request such information from a content source e.g., which may provide a content service). The information may have been bundled with the program availability information already received. To illustrate, consider a case where the cache controller has determined that the latest episode of a show called "Checkmate" is relevant to a mobile phone, a tablet device, and a 4K UHD TV in a home network. The cache controller may request from the content service information about the scalable layers available for this program, or the cache controller may look up the information in an already received program guide (e.g., which may be also from the content service). The cache controller may request a manifest associated with the program (e.g., a DASH MPD file), and the manifest may contain a listing of the available scalable layers and/or the scalability type for one or more of the layers.

The cache controller may determine the relevance of the available scalable layers to various devices, cache devices, including devices with viewing capabilities). For example, if a content object a TV program) is determined to be relevant to the devices (e.g., as described herein), the cache controller may further determine the relevance of the available scalable layers of the content object to the devices. The cache controller may compare the available scalable layers to the property information (e.g., capability information) of the devices. The result of the comparison may be used to determine which scalable layers are relevant to which device, and/or whether an available scalable layer for a program may be decoded by/used by a device to which the program itself has been determined relevant. The comparison may be conducted based on the layer type and/or associated parameters of the available scalable layer including, for example, an associated bit rate, frame rate, resolution, an associated profile, and/or an associated level. The property information (e.g., capability information) of the devices may be received as described herein.

In the "Checkmate" example given herein, the cache controller may determine that the latest episode of the show is relevant to three devices: a mobile phone, a tablet device, and a 4K UHD TV in a home network. The cache controller may obtain scalable layer availability for the latest episode of the show. The cache controller may determine the following with respect to the scalable layers' availability. A first scalable layer (e.g., a base layer representation) may allow decoding of the content at a standard definition resolution. A second scalable layer (e.g., a spatial scalable enhancement layer representation) when combined with the base layer may allow decoding of the content at 1080 p resolution. A third scalable layer (e.g., a combined spatial scalable and color gamut scalable enhancement layer) when combined with the first two scalable layers may allow decoding of the content at 4K UHD resolution with an enhanced BT.2020 color gamut. Comparing the layer information to the property information (e.g., capability information) for the three devices for which the "Checkmate" episode is relevant, the cache controller may make the following determinations. All three devices may be capable of using (e.g., decoding, playing, and/or possibly caching) the first layer, and as such the first layer may be relevant to all three devices. Both the tablet device and the 4K UHD TV may be capable of using the second layer, but the mobile phone lacks such capability (e.g., the mobile phone may not be capable of displaying 1080 p resolution, or it may not support a profile/level associated with the second scalable layer, or it may not support scalable decoding). Therefore, the second layer may be relevant to the tablet device and the 4K UHD TV, but not to the mobile phone. The 4K UHD TV may be capable of using the third layer (e.g., the 4K UHD TV may support the full 4K UHD resolution, decoding and display of the enhanced BT.2020 color gamut, and/or a coding/profile/level combination associated with the third layer), while the tablet device may be incapable of using the third layer. Thus, the third layer may be relevant only to the 4K UHD TV.

The cache controller may determine a mapping of the available scalable layers to cache locations. The determination may be made based on one or more factors including, for example, the following: the relevance of the scalable layers to the devices, the caching capabilities of the devices, available storage space on the devices (e.g., assuming the devices are cache-capable devices), the presence or absence of a home gateway, and/or the presence or absence of other caching devices (e.g., cache devices that are accessible to multiple devices) to which a scalable layer is relevant, such as a local media server in the home network.

In the "Checkmate" example given herein, the cache controller may have determined the following. The first scalable layer of the latest 'Checkmate' episode may be relevant to the mobile phone, the tablet device, and the 4K UHD TV. The second scalable layer may be relevant to the tablet device and the 4K UHD TV. The third scalable layer may be relevant to the 4K UHD TV. The cache controller may know (e.g., based on processing described herein) that there is a cache-capable home gateway in the home network, and that all three devices may access content (e.g., scalable layer content) cached on the gateway. The cache controller may have obtained (e.g., from processing described herein) information on cache capabilities and/or information on current cache space available for both the gateway and the three end user devices. The cache controller may determine that the first and second layers (e.g., which may be relevant to more than one device) should be cached on the home gateway, and that the third layer (e.g., which may be relevant only to the 4K UHD TV) should be cached on the 4K UHD TV. The cache controller may verify that the home gateway has sufficient cache space to store the first and second scalable layers of the "Checkmate" episode, and that the 4K UHD TV has sufficient cache space to store the third scalable layer. If sufficient cache space is lacking (e.g., on any of the devices), the cache controller may take actions accordingly.

For example, the cache controller may instruct the home gateway and/or the 4K UHD TV to remove from their cache older content or content less likely to be used in order to make room for the scalable layer content of the newly identified Checkmate episode. For example, the cache controller may determine an alternate cache configuration which meets the needs of the devices to which the Checkmate episode is relevant. For example, if the home gateway lacks sufficient cache space, the cache controller may determine an alternate caching structure where the first layer may be cached on the mobile phone, the first and second layers may be cached on the tablet, and all three layers may be cached on the 4K UHD TV.

The mapping of available scalable layers to cache locations may include allowing one or more devices to retrieve (e.g., at play time) a scalable layer from a location outside the home network. The outside location may be a CDN cache, a content origin server, and/or the like. For instance, in the "Checkmate" example given herein, a possible mapping may be to cache the first layer on the mobile phone and the tablet device, to cache the first and third layers on the 4K UHD TV, and to not cache the second layer within the home network (e.g., to have the tablet device and/or the 4K UHD TV retrieve the second layer from a CDN cache or from the origin server at playback time).

When considering the viability of a caching structure (e.g., a mapping from scalable layers to cache locations), the cache controller may examine a plurality of factors. These factors may include, for example, the available network connection types, connection speeds of the various devices, whether a device is fixed or mobile, and/or how much time a device spends in the home network. The potential impact of the factors on caching structure may be illustrated as follows.

If a device is mobile and frequently watches content when the device is outside of the home network, the cache controller may make such a device "self-contained" in that it may have the base layer (e.g., the base layer and one or more scalable enhancement layers) cached on the device. For example, if a mobile phone is often used to watch the 'Checkmate' show outside the home network, then the cache controller may cache the base layer on the mobile phone directly, rather than having the mobile phone retrieve the base layer from another cache device (e.g., from the home gateway cache).

If a device is fixed or is used to watch the content typically within the home network, then the cache controller may cache enough scalable layers on the device such that the remaining layers may be streamed at playback time via a home network connection (e.g., at its typical available speed, which may be estimated based on observed usage). For example, direct caching on a device may be used to reduce the bandwidth needed at play time so that it is within the expected available bandwidth (e.g., the bandwidth available in the home network at the time such content is expected to be watched).

If a device watches content both inside the home network and outside the home network (e.g., over a cellular network), the cache controller may arrange the caching operation to take both scenarios into consideration. For example, if the device is connected over a cellular network, caching may be arranged such that at playback time the layers not cached directly on the device may be retrieved using the expected cellular connection speed. If the playback is from within the homework, caching may be arranged such that the layers not cached directly on the device and not available from the home gateway or other cache within the home network may be retrievable using the expected home network connection speed.

Redundancy may be included in the connection speed calculation. Taking redundancy into consideration may account for other possible network usage in addition to usage by the streaming device. For example, in the home network it is possible that multiple devices may stream content simultaneously. The cache controller may take such usage into consideration when determining the connection speed (e.g., from the point of view of a cache device), Network connection types and/or observed speed data may be provided to the cache controller (e.g., as part of the processing that obtains device characteristics). The layers not available from cache within the home gateway may, in some cases, be available from the outside cache or origin server in multiple bitrates (e.g., in an Adaptive Bitrate format such as MPEG DASH). The prediction of available connection speed may be skipped (e.g., in the scenarios described above).

The cache controller may direct various devices to cache the scalable layers that are determined to be mapped to each device. For example, the cache controller may send a message to a caching device (e.g., the home gateway, another caching device, a cache-capable end user device, etc.) to instruct the cache device to store a particular set of scalable layers for one or more content objects. The message may identify the content objects and the scalable layers of such objects that the cache device should store. The message may identify the locations (e.g., using URLs or other identifiers) from which the scalable layers may be retrieved and/or the time such retrieval may be carried out. In response, the cache device may request, retrieve, and cache the scalable layers based on the instructions sent by the cache controller.

The cache controller described herein may be located in various places. For example, the cache controller may be located in a general public network such as the Internet, a content delivery network such as a CDN network, or a mobile network), a corporate network (e.g., within the back-end infrastructure of a content provider or content distributor), a home network a home gateway, a router, or in an end user device), and/or the like.

Figure 10:
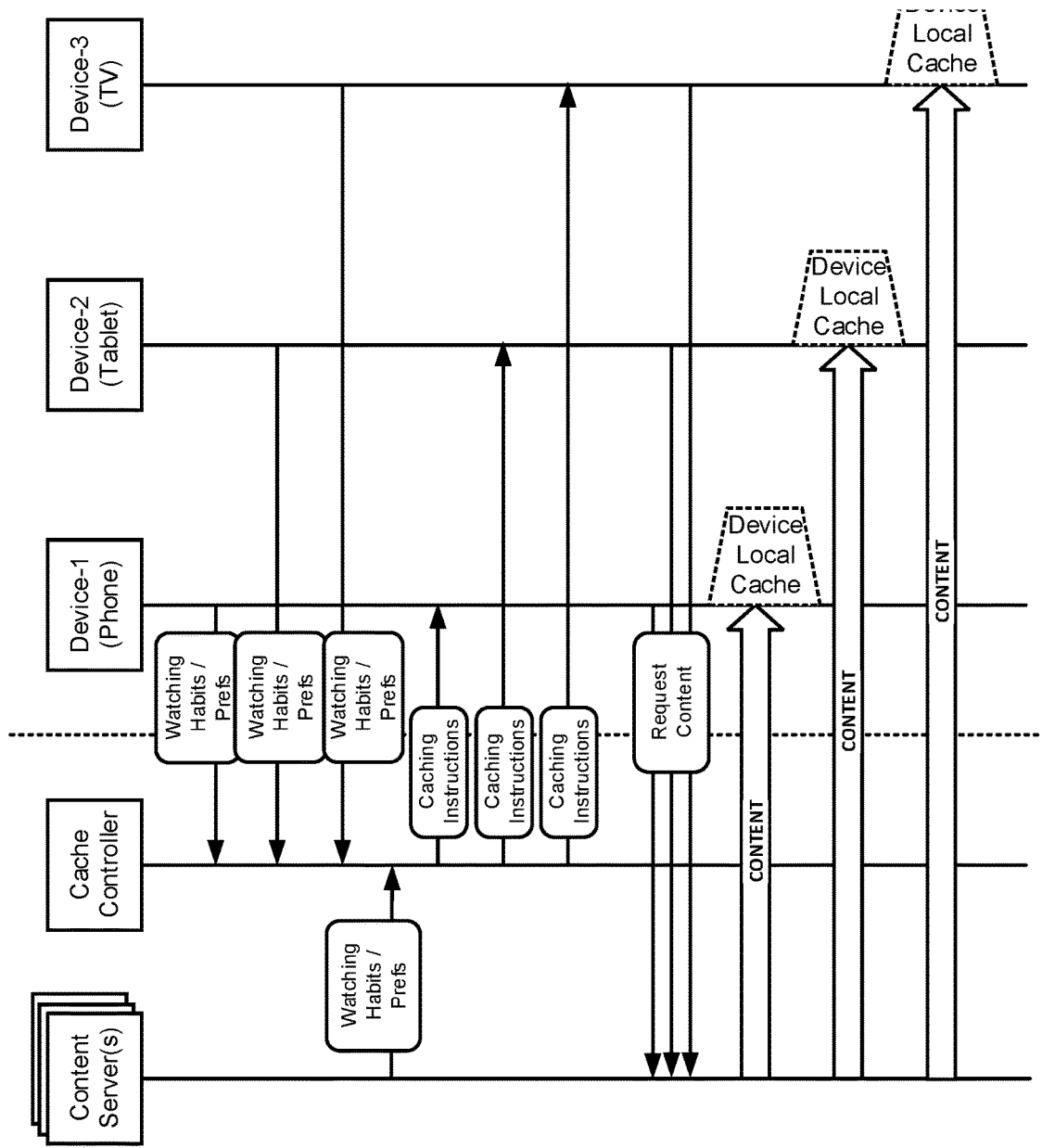
FIG. 10 shows an example of intelligent cache control using a network-based controller.

FIG. 10 shows an example of cache control using a network-based controller (e.g., the controller may reside outside a home network). Such a cache controller may be referred to herein as a network-based cache controller. The network in which the cache controller resides may include, for example, the Internet, a CDN network, a content provider network, a content distributor network, and/or the like. The network-based cache controller may control caching for one content provider or for multiple content providers. The network-based cache controller may control caching for multiple end user devices, as shown in the figure.

The network-based cache controller may be configured to execute one or more of the functions described herein (not all are shown in FIG. 10). For example, the cache controller may obtain a list of devices that may include, for example, a mobile phone, a tablet device, and/or a TV device. The list may be obtained, e.g., by installing an application or suitable software on the devices, as described herein. The application or software may communicate to the cache controller and identify the devices. The cache controller may obtain property information (e.g., capability information) of the devices and/or user content preference associated with the devices. The devices may report the content preference to the cache controller. Alternately or additionally, a content service may report the content preference of the devices to the cache controller. The cache controller may perform other functions including, for example, obtaining program availability, determining which programs are relevant to which devices, obtaining scalable layer availability (e.g., for the programs or content objects which are relevant to at least one of the devices), determining which scalable layers of the programs are relevant to which devices, and/or determining a mapping of such scalable layers to the devices with caching capabilities.

Based on the mapping of scalable layers to devices, the cache controller may send caching requests to one or more of the devices. The requests may instruct the devices to cache the scalable layers which the mapping indicates should be cached by the respective devices. In response to the caching instruction, the devices may request and cache the relevant scalable layers from an available location (e.g., from a content origin server or a CDN cache, which may be identified in the caching instruction).

When playing back media content, a device (e.g., the phone, tablet, or TV shown in FIG. 10) may use any or all of the scalable layers stored in the device's local cache. For example, after a device executes the caching instructions as shown FIG. 10, the device may perform one or more of the following actions. The device may have all the layers it needs for a program stored in advance in its local cache, in which case at playback time the device may play the content for that program entirely from its local cache. The device may have a subset of the layers it needs for a program stored in advance in its local cache, in which case at playback time the device may utilize the layers available from its local cache together with one or more layers streamed from another cache location (e.g., from an origin server or from a cache outside the device). The device may not have any layers cached for a given program. For example, the cache controller may not have been able to predict the program that would be relevant to the device, in which case the cache controller may not have instructed the device to cache any layers for the program. In such a situation, the device may stream the content (e.g., the entire content) from an outside source such as an origin server or a CDN cache at playback time.

Figure 11:
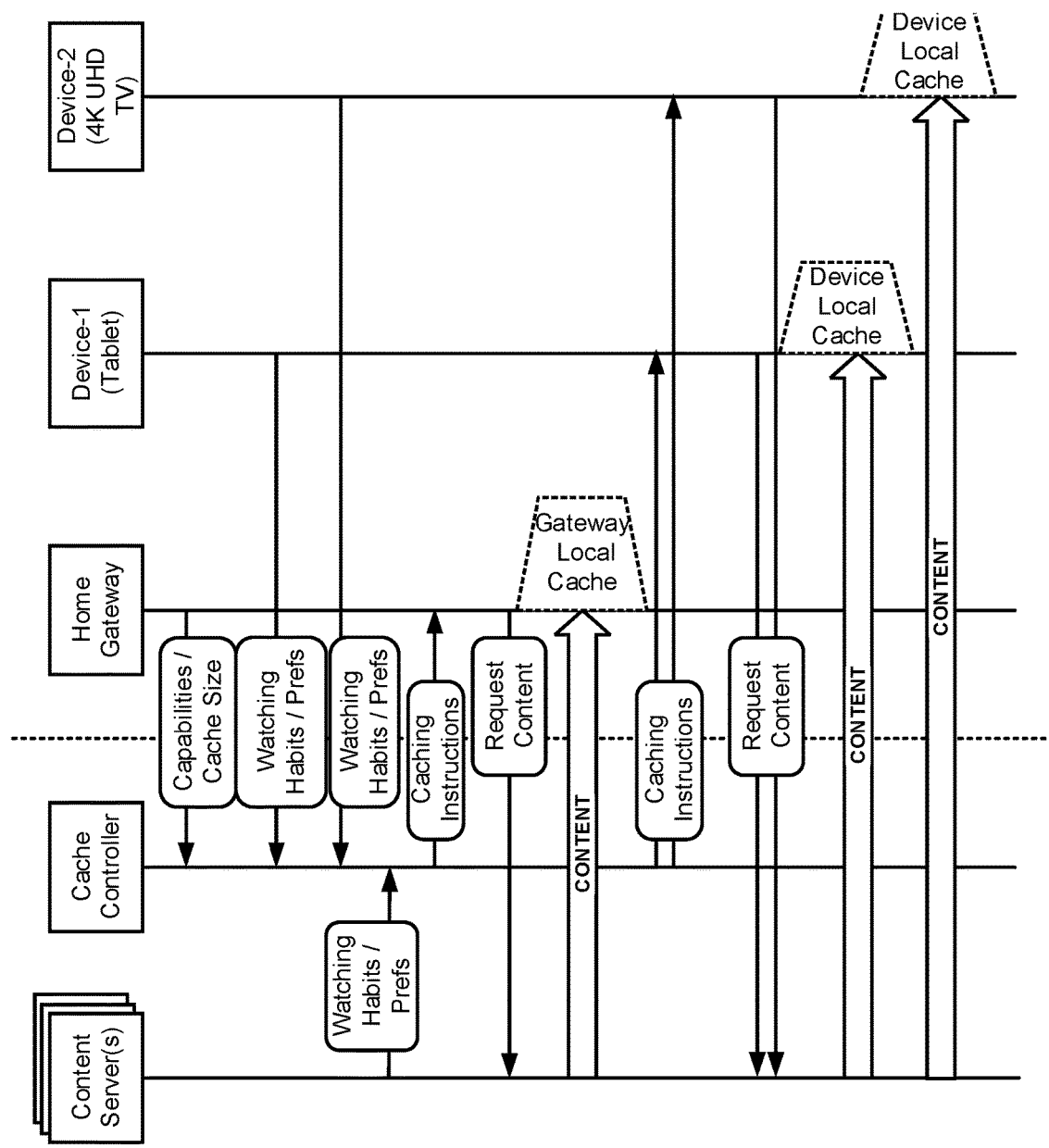
FIG. 11 shows an example of intelligent cache control using a network-based cache controller and home gateway cache.

FIG. 11 shows another example of a cache controller residing outside of a home network and interacting with a home gateway. The home gateway may have caching capabilities. The cache controller may be referred to herein as a network-based cache controller with home gateway cache. The cache controller itself may reside on the Internet, a CDN network, a content provider network, a content distributor network, and/or another suitable type of networks. The cache controller may control the caching of content for one content provider or for multiple content providers. The cache controller may control the caching of content on the home gateway and/or other end user devices, as shown in FIG. 11.

The network-based cache controller with home gateway cache may be configured to execute one or more of the functions described herein (not all are shown in FIG. 11). For example, the cache controller may obtain information about a list of devices including, for example, the home gateway, a tablet device, and/or a 4K UHD TV. The list of devices may be connected to a home network. As such, information about the devices may be obtained via a device discovery protocol (e.g., such as UPnP) running on the home gateway. The home gateway may construct the list and/or communicate the list to the cache controller. The list may include the home gateway as a cache-capable device, and/or the discovered end user devices. The cache controller may obtain property information (e.g., capability information) for the devices (including the home gateway). For example, the devices may directly communicate their property information (e.g., capability information) to the cache controller, or the home gateway may obtain the property information (e.g., capability information) from the devices and communicate such information to the cache controller. The property information (e.g., capability information) may describe the capability of the home gateway and/or the capability of the end-user devices. The property information (e.g., capability information) may be included in the same communication that identifies the list of devices.

The network-based cache controller with home gateway cache may obtain user content preference (e.g., which may be reflected through or derived from the user's viewing habits, viewing history, and/or service subscription) associated with an end device. For example, as shown in FIG. 11, an end user device may report viewing history/habits/preferences to the cache controller. Alternately or additionally, a content service may report the viewing history/habits/preferences for an end user device to the cache controller. The cache controller may execute one or more other functions including, for example, obtaining program availability, determining which programs are relevant to which devices, obtaining scalable layer availability (e.g., for the programs or content objects which are relevant to at least one of the devices), determining which scalable layers of the programs are relevant to which devices, and/or determining a mapping of such scalable layers to the devices with caching capabilities.

Based on the mapping of scalable layers to devices, the cache controller may send caching requests to one or more of the devices. The requests may instruct the devices to cache the scalable layers which the mapping indicates should be cached by the respective devices. In response to the caching instruction, the devices may request and cache the relevant scalable layers from an available location (e.g., from a content origin server or a CDN cache, which may be identified in the caching instruction). For example, scalable layers that may be useful to or usable by both the tablet device and the 4K UHD TV may be cached in the home gateway cache, while scalable layers that may be useful to or usable by only one of the two end user devices may be cached directly on the end-user device for which the layer is relevant.

When playing back media content, an end user device may determine which scalable layers are needed. The end user device may access such layers from one or more sources including, e.g., from its local cache, from the cache in the home gateway, and/or from an outside source such as a CDN cache or a content origin server.

Figure 12:
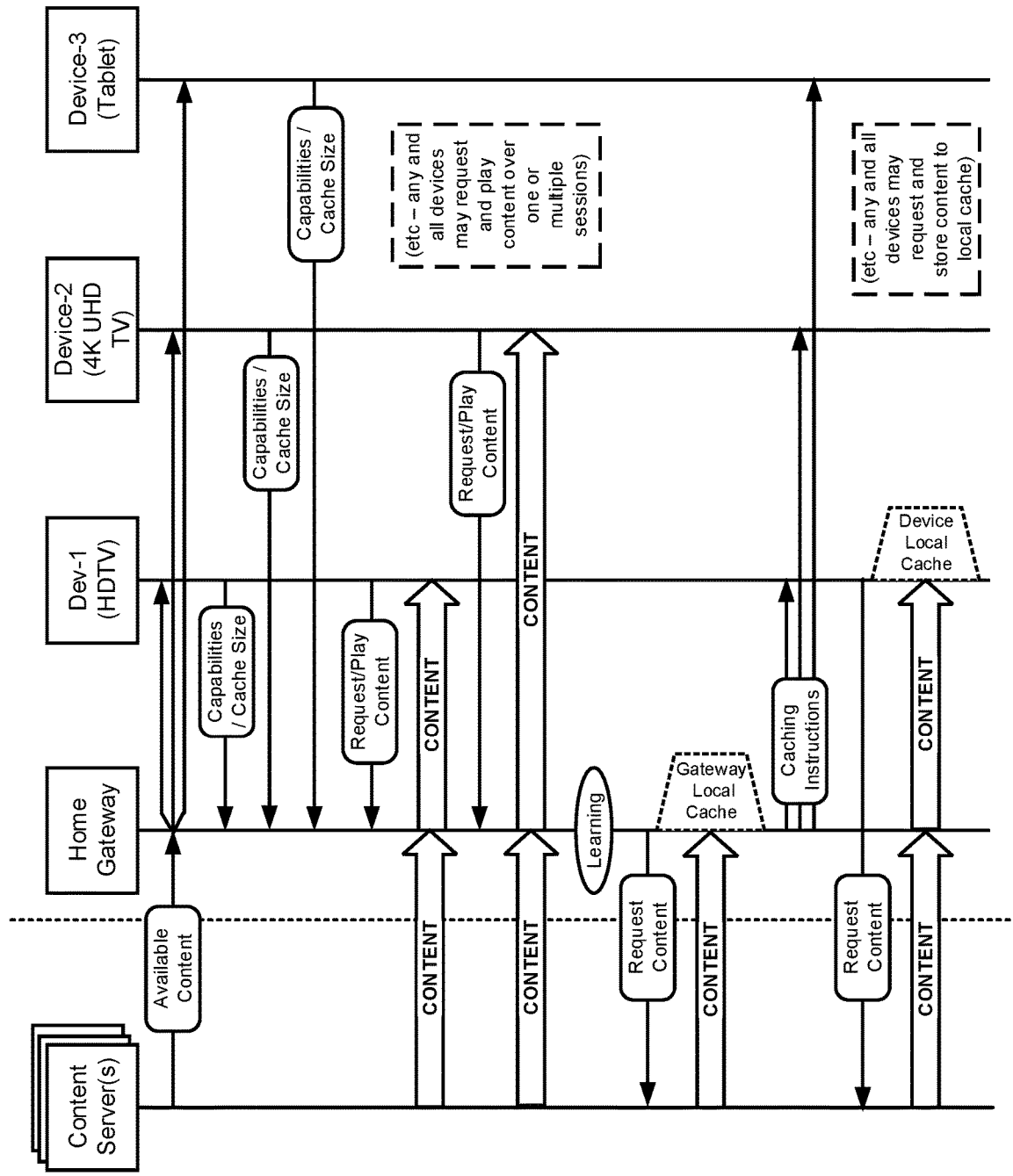
FIG. 12 shows an example of intelligent cache control using a gateway-based cache controller.

FIG. 12 shows an example of a cache controller residing within a home gateway (e.g., the home gateway may have caching capabilities). Such a cache controller may be referred to herein as a gateway-based cache controller and may be implemented in different ways. For example, the cache controller may be built into the home gateway. The cache controller may be implemented as software installed and running on the home gateway. Further, although FIG. 12 may indicate that the cache controller physically resides in a home gateway, one skilled in the art will recognize that the example may be applicable to scenarios in which the cache controller resides within a different entity of the home network. For example, the cache controller may be software running on a PC, or the cache controller may be built into a home media server device, or the cache controller may reside in a router that is separate from the home gateway. More generally, the cache controller may reside in any device within the home network that is capably, of communicating with various other end user devices in the home network, and/or that may communicate with remote content providers/content servers. The cache controller may control the caching of content for one content provider or for multiple content providers. The cache controller may control the caching of content on the home gateway and/or other end user devices.

The gateway-based cache controller may be configured to execute one or more of the functions described herein (not all are shown in FIG. 12). For example, the cache controller may obtain a list of devices which may include the home gateway, an HDTV, a 4K UHD TV, and/or a tablet device. The list of devices may be obtained via a device discovery protocol (e.g., such as UPnP) running on the home gateway or another device in the home network (e.g., a UPnP program may discover the devices and construct the list). The list may be passed to the gateway-based cache controller. The list may include the home gateway as a cache-capable device and/or the discovered end user devices. The cache controller may obtain property information (e.g., capability information) for the devices. For example, the devices may directly communicate their property information (e.g., capability information) to the cache controller, or the home gateway or another device in the home network may obtain the property information (e.g., capability information) from the devices and communicate such information to the cache controller. The property information (e.g., capability information) may describe the capability of the home gateway and/or the discovered end-user devices. The property information capability information) may be included in the same communication that identifies the list of devices.

The gateway-based cache controller may obtain user content preference (e.g., which may be reflected through or derived from the user's viewing habits, viewing history, and/or service subscription) associated with an end user device. For example, as shown in FIG. 12, an end user device may report the viewing preferences/habits/history to the gateway-based cache controller. Alternately or additionally, a content services may report the viewing preferences/habits/history for an end user device to the gateway-based cache controller. The gateway-based cache controller may execute one or more other functions, including, for example, obtaining program availability, determining which programs are relevant to which devices, obtaining scalable layer availability (e.g., for the programs or content objects which are relevant to at least one of the devices), determining which scalable layers of the programs are relevant to which devices, and/or determining a mapping of such scalable layers to the devices with caching capabilities. These and other example functions may be represented in the aggregate as "learning" by the cache controller.

Based on the mapping of scalable layers to devices, the cache controller may instruct the home gateway to request the media content determined to be relevant. The media content may be stored in the local cache of the home gateway. The cache controller may send caching requests to one or more other devices identified by the mapping. The requests may instruct the devices to cache the scalable layers which the mapping indicates should be cached by the respective devices. In response to the caching instruction, the devices may request and cache the relevant scalable layers from an available location (e.g., from a content origin server or a CDN cache, which may be identified in the caching instruction). For example, scalable layers that may be useful to or usable by both the tablet device and the 4K UHD TV may be cached in the home gateway cache, while scalable layers that may be useful to or usable by only one of the two end user devices may be cached directly on the end-user device for which the layer is relevant When playing back media content, an end user device may determine which scalable layers are needed. The end user device may access such layers from one or more sources, e.g., from its local cache, from the cache in the home gateway, and/or from an outside source such as a CDN cache or origin server.

Figure 13:
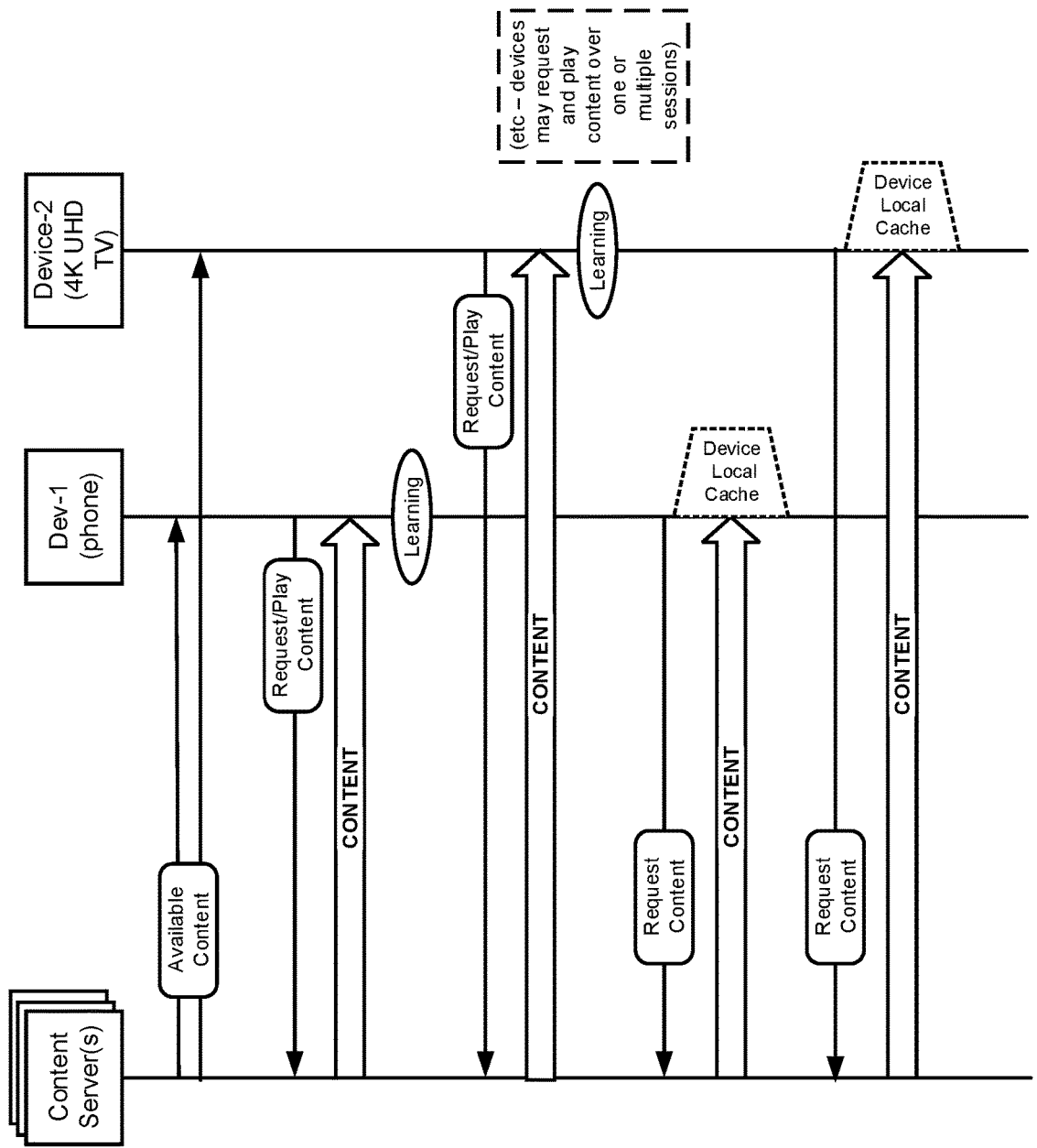
FIG. 13 shows an example of intelligent cache control using a device-based cache controller.

FIG. 13 shows an example of a cache controller residing within an end-user device. Such a cache controller may be referred to herein as a device-based cache controller. The device-based cache controller may reside in a phone device, in a tablet, in a TV device, in a set-top box, or in various other end user devices (e.g., other WTRUs as described herein) that may have the capability to cache and/or play back media content. The device-based cache controller may control local caching of media content. The media content may be from one content provider or from multiple content providers. The device-based cache controller may be implemented in various ways, as illustrated by the following examples. The cache controller may be implemented as software running on the end user device. The cache controller may be part of a media playback client (e.g., a general playback client or a client specific to a content service). The cache controller may be part of a DASH client. The cache controller may be provided as pre-installed software. The cache controller may be part of the operating system of the end user device.

The device-based cache controller may be configured to execute one or more of the functions described herein (not all are shown in FIG. 13). For example, the device-based cache controller may have or may obtain property information (e.g., capability information) for the device on which the cache controller resides. Such information may be built into the software (e.g., a media playback client) of which the cache controller may be a part. The information may be accessible via an API to the software or to the device OS. The device-based cache controller may track or may obtain user viewing preferences/history/habits for the device on which the cache controller resides. In an example, the cache controller may be implemented within a media playback client (e.g., a client specific to a content service) and the user viewing preferences/history/habits may be available within the media client. In an example, the user viewing preferences/history/habits may be requested from the one or more content providers for which the cache controller controls caching. The viewing preferences/history/habits of the end user device may be tracked in an ongoing manner (e.g., by a playback client or by a content provider) as the user selects content to watch on the end user device.

The device-based cache controller may execute one or more other functions, including, for example, obtaining program availability, determining which programs are relevant to the device on which the cache controller resides, obtaining scalable layer availability (e.g., for the programs or content objects which are relevant to the device), determining which scalable layers of the programs are relevant to the device, and/or determining which scalable layers should be stored in a local cache of the device. These and other example functions may be represented in the aggregate as "learning" by the cache controller.

The device-based cache controller may instruct the device on which it resides to request the scalable layers of media content determined to be relevant to the device. The scalable layers may be received and/or stored in advance of playback. The scalable layers may be stored within local cache space on the device. The cache controller may manage the local cache space. The requesting, receiving and storing operations described herein may be repeated periodically. The cache controller may decide which layers of which content objects (e.g., the content object may be a TV program) should be kept in the local cache at a given time. In some situations (e.g., when programs are determined to be no longer relevant or less important than newly available programs), the cache controller may remove previously cached scalable layers of a program from the local cache and may instruct the device to retrieve relevant scalable layers of a newly available program into the local cache. There may be multiple device-based cache controllers (e.g., a cache controller running on each individual device of a home network), in which scenario the operations described herein may be executed independently by the cache controllers.

When playing back media content, the device may utilize any scalable layers that have been cached into the device's local device cache. Other available scalable layers from outside sources (e.g., from origin servers and/or CDN cache locations) may be streamed as needed, e.g., based on a number of criteria, as described herein.

A DASH MPD may support multiple and/or alternative segment locations (e.g., by using a BaseURL tag or element). The support may be provided such that identical segments may be accessible at multiple locations. For example, a DASH streaming device (e.g., a DASH client) may use the base URLs provided in the BaseURL tag/element. The DASH streaming device may determine which URLs to use for a request.

For SHVC, an enhancement layer may depend on one or more lower layers for decoding. Different segments from different sources may be synchronized. Layer based buffer management may be deployed at client side (e.g., on a streaming device), for example, with a leaky bucket model, to balance buffer levels (e.g., buffer fullness) for the streaming sources. The streaming device may allocate individual buffers for the respective streaming sources. Inter-dependencies among the streaming sources may be considered for buffer control.

Figure 14:
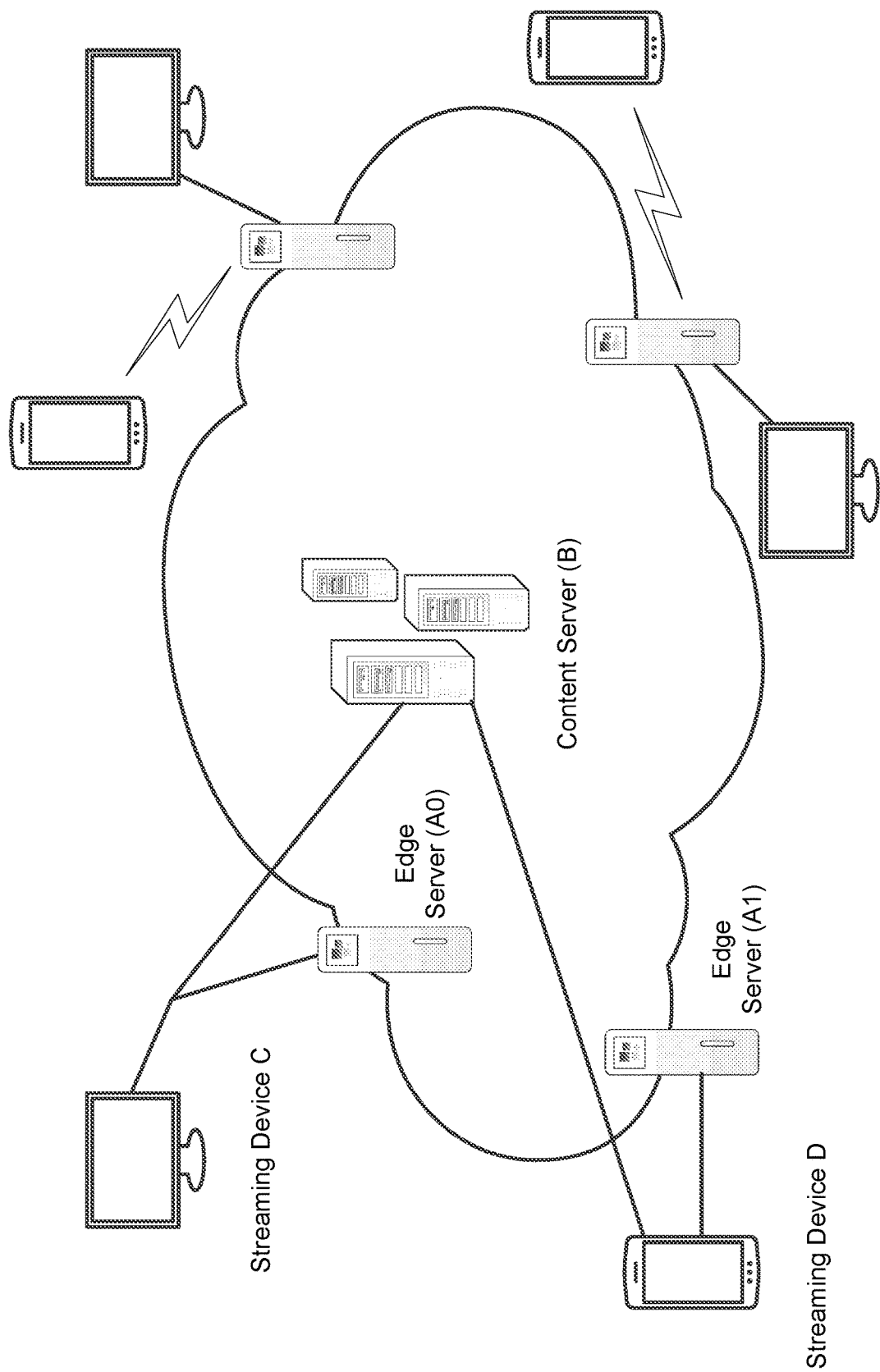
FIG. 14 shows an example of video streaming from multiple sources.

FIG. 14 shows an example of video streaming from multiple sources. Streaming devices C and D may receive streams from two content sources A and B (e.g., the content sources may include edge server A0, A1, and/or a content server B) simultaneously. The streams from source B may be enhancement layer representations of media content, which may depend on the streams from source A (e.g., base layer representations of the media content). The arrival times of the streams (e.g., which may correspond to segments from different layers) may be different. The streaming devices may synchronize the streams (e.g., the segments) based on their respective arrival times.

Figure 15A:
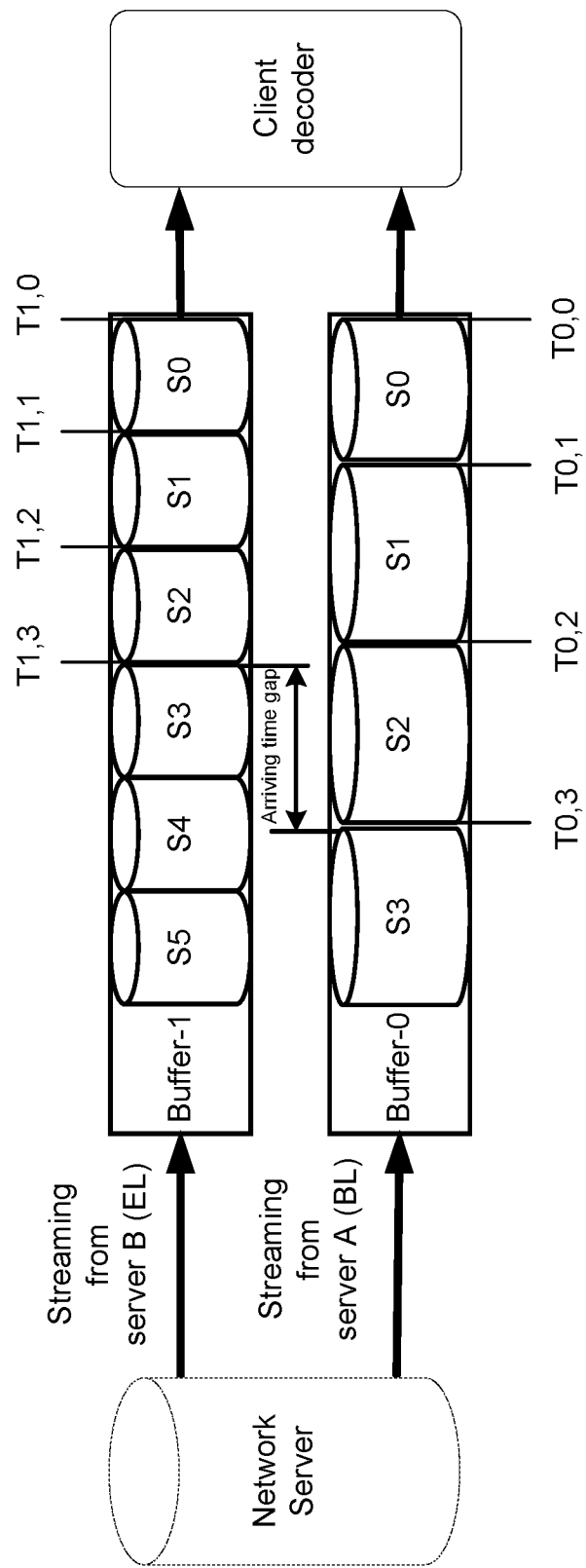
FIG. 15A shows an example buffer model for a multi-source streaming scenario.
Figure 15B:
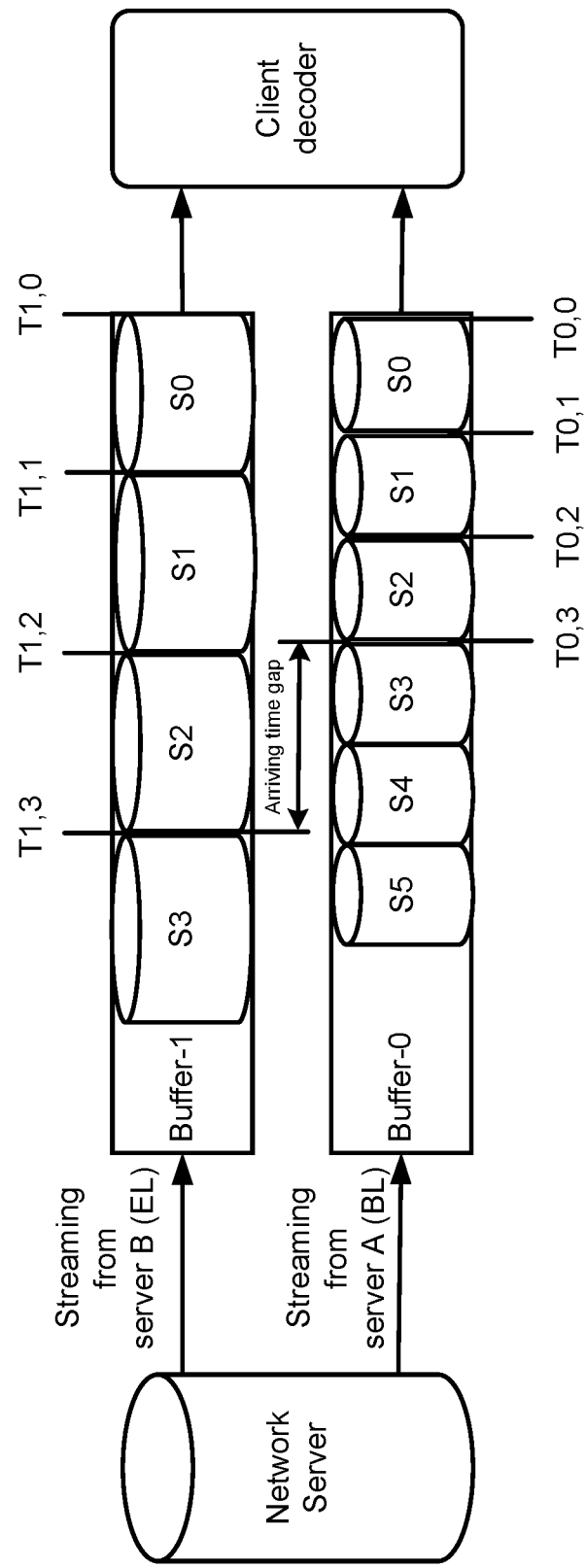
FIG. 15B shows another example buffer model for a multi-source streaming scenario.

FIGS. 15A and 15B show example buffer models for a multi-source streaming scenario. As shown in the examples, the segments in Buffer-0 and Buffer-1 may be synchronized based on the segments' respective arrival times ($T_i$) at a streaming device. In the example shown in FIG. 15A, the arrival time $T_{1,3}$ of segment S3 (e.g., an enhancement layer segment from server B) in Buffer-1 may be ahead of the arrival time $T_{0,3}$ of its dependent layer segment (e.g., a base layer segment from server A) in Buffer-0. In this scenario, the streaming device may decide to stop fetching segments from server B. More generally, assuming a (i+1)-th layer depends on an i-th layer, the downloading of a j-th segment of the (i+1)-th layer may be terminated when the j-th segment of the (i+1)-th layer arrives ahead of the j-th segment of the i-th layer by a threshold amount. Such a condition may be represented by (2) below.

$$T_{i,j} + T_{i+1,j} > \text{Threshold} \qquad (2)$$

The value of Threshold in (2) may be determined based on the time difference between the current playback time and the playback time of the j-th segment of the video. For example, if the current segment is at 5 min:00 sec of the video, and the playback time of the j-th segment is 6 min:30 sec, then the value of Threshold may be set to a value below (e.g., slightly below) 1 min:30 sec. Such a threshold value may allow the (i+1)-th layer to arrive in time for decoding and playback. The threshold value may be pre-defined, set dynamically, and/or determined in various other suitable ways Media content may be coded into multiple layers (e.g., an EL layer and a BL layer). In some cases, a streaming device may receive streams for the multiple layers from a shared link (e.g., such as streaming device D shown in FIG. 14). In some cases, a streaming device may receive the streams for the multiple layers with separate links (e.g., such as streaming device C shown in FIG. 14). In the former scenario, more bandwidth may be allocated to download the base layer stream.

In the example shown in FIG. 15B, the arrival time $T_{1,3}$ of an enhancement layer S3 in Buffer-1 may be behind the arrival time $T_{0,3}$ of the segment's dependent layer segment in Buffer-0 buffer. The streaming device in such a scenario may request that lower bitrate segments be transmitted from the slower source (e.g., from server B). This way, segments from the slower source (e.g., the EL segments in Buffer-1) may be aligned with the segments from the faster source (e.g., the BL segments in Buffer-0, which are downloaded from server A).

The request for lower bitrate representation of a j-th segment of the media content may be expressed as (3). As shown, such a request may be made when the arrival time $T_{i+1,j}$ of the j-th segment of the (i+1)-th layer is behind the arrive time $T_{i,j}$ of the j-th segment of the i-th may by a threshold value. The threshold value may be pre-defined, set dynamically, and/or determined in various other suitable ways.

$$T_{i+1,j} - T_{i,j} > \text{Threshold} \qquad (3)$$

Figure 16A:
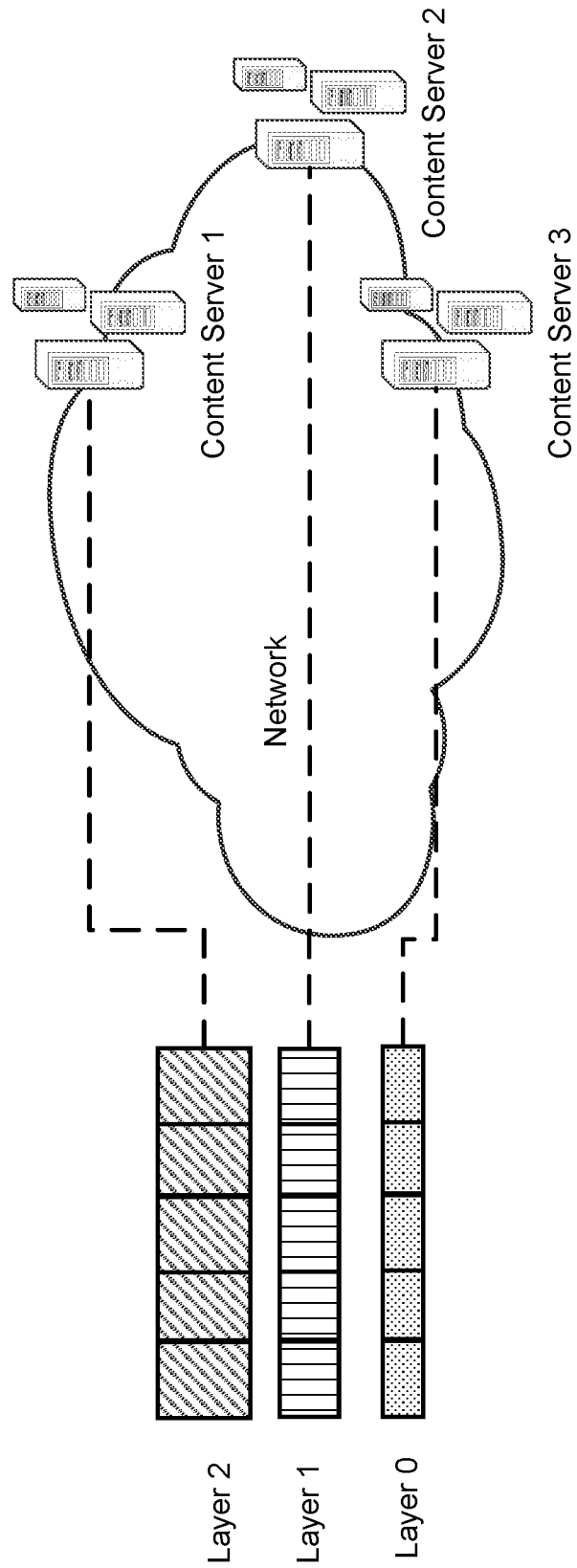
FIG. 16A shows an example scheme for a DASH streaming device to request different layer segments from different locations.
Figure 16B:
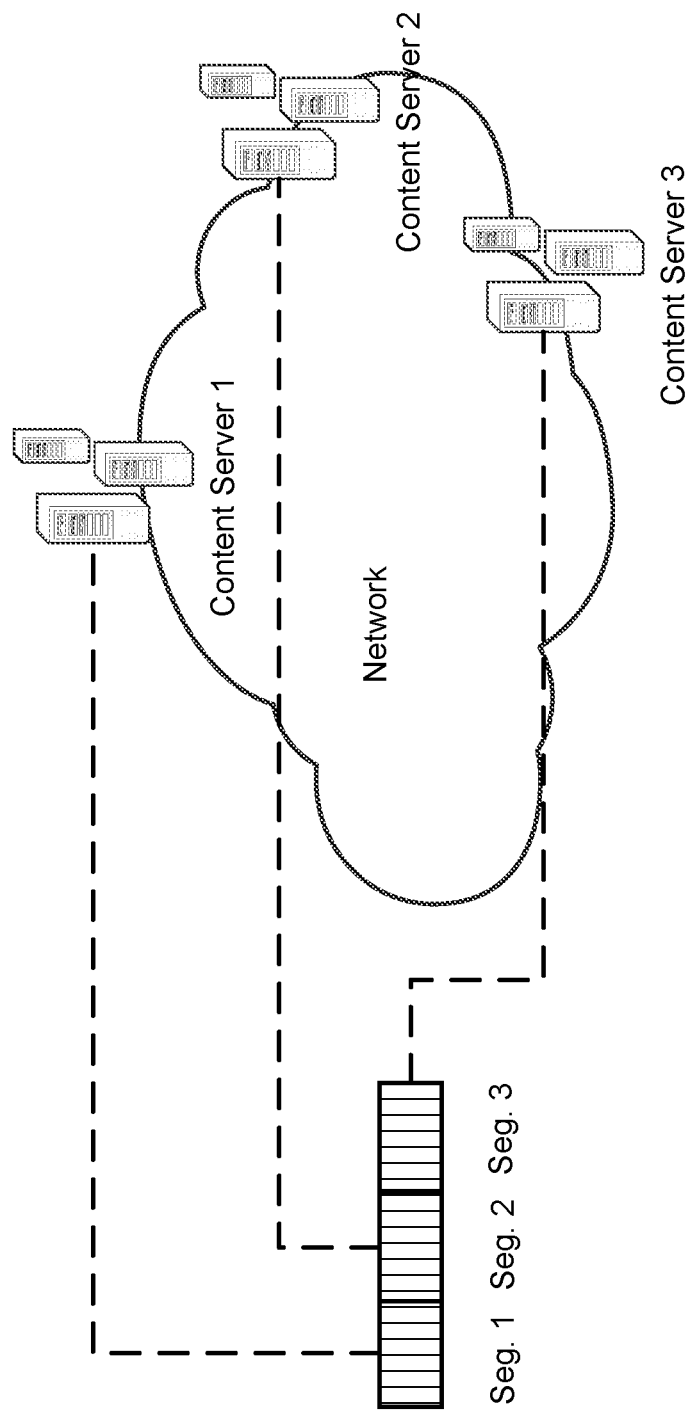
FIG. 16B shows an example scheme for a DASH streaming device to request different segments of the same layer from different locations.

A client may request different layer segments from different sources (e.g., as shown in FIG. 14). The size of a base layer segment may be smaller than the size of an enhancement layer segment. The link between the client and the server/cache storing the base layer content may be faster than the link between the client and the server storing the enhancement layer content. When necessary, the client may switch to lower bitrate segments of the enhancement layer to maintain the quality of playback. A DASH streaming device (e.g., a DASH client) may stream multiple segments in parallel. The bandwidth of multiple downlink paths may be utilized. FIG. 16A shows an example scheme for a DASH streaming device (e.g., a DASH client) to request different layer segments from different locations. FIG. 16B shows an example scheme for a DASH streaming device to request different segments of the same layer from different locations.

When requesting different layer segments from different locations (e.g., each location may correspond to a link such as a URL), the segment arrival time gap may be reduced (e.g., as shown in FIGS. 16A-16B). A streaming device may select a link for a particular layer segment based on the respective sizes of the layer segments and/or the available bandwidths of the links. Base layer segments may be fetched prior to enhancement layer segments, for example, based on the relationship shown in (4).

$$\frac{S_{i,j}}{BW_k} \geq \frac{S_{0,j}}{BW_n} \quad (4)$$

$S_{i,j}$ may represent the size of the j-th segment of the i-th layer. $S_{o,j}$ may represent the size of the j-th segment of the base layer. BWk, BWn may represent the bandwidths of the k-th and n-th links, respectively. As shown in (4), the k-th and n-th links may be selected based on the respective segment sizes and available bandwidths so that the base layer representation may be downloaded via the n-th link before the enhancement layer representation may be download via the k-th link. More generally, a streaming device may choose a different link to request a different segment, e.g., based on the estimated bandwidths of the links and the sizes of the segments.

Although in the below examples wireless network details are provided, the embodiments described herein may be implemented and/or used, for example, in a wired and/or wireless network (e.g., in device(s) of such networks, such as network devices, end user devices, etc.). These devices may include a wireless transmit/receive unit (WTRU) that works wirelessly or a WTRU used in a wired network (e.g., a computer or other end user device with a wired connection to the network). These devices may include home network devices (e.g., TVs, set-top boxes, gateways, routers) that may work wirelessly or in a wired network. For illustration purposes, the disclosure below describes an example wireless communication network 500 (e.g., as shown in FIG. 17A) in which one or more disclosed embodiments may be implemented or used.

The communications system 500 may be a multiple access system that provides content, such as voice, data, video, messaging, broadcast, etc., to multiple wireless users. The communications system 500 may enable multiple wireless users to access such content through the sharing of system resources, including wireless bandwidth. For example, the communications systems 500 may employ one or more channel access methods, such as code division multiple access (CDMA), time division multiple access (TDMA), frequency division multiple access (FDMA), orthogonal FDMA. (OFDMA), single-carrier FDMA (SC-FDMA), and the like.

Figure 17A:
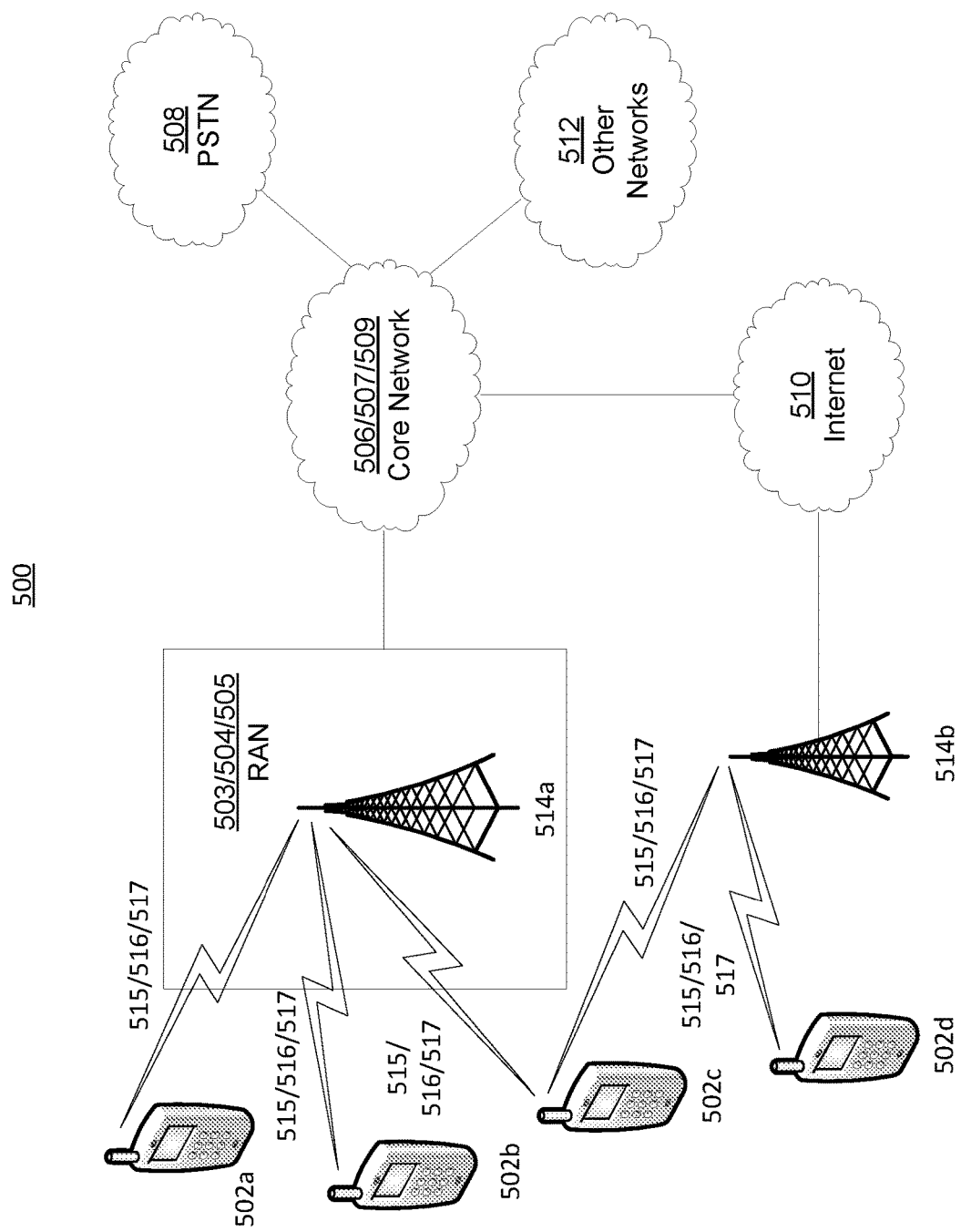
FIG. 17A depicts a diagram of an example communications system in which one or more disclosed embodiments may be implemented.

As shown in FIG. 17A, the communications system 500 may include wireless transmit/receive units (WTRUs) 502a, 502b, 502c, and/or 502d (which generally or collectively may be referred to as WTRU 502), a radio access network (RAN) 503/504/505, a core network 506/507/509, a public switched telephone network (PSTN) 508, the Internet 510, and other networks 512, though it will be appreciated that the disclosed embodiments contemplate any number of WTRUs, base stations, networks, and/or network elements. Each of the WTRUs 502a, 502b, 502c, and/or 502d may be any type of device configured to operate and/or communicate in a wireless environment. By way of example, the WTRUs 502a, 502b, 502c, and/or 502d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 500 may also include a base station 514a and a base station 514b. Each of the base stations 514a, 514b may be any type of device configured to wirelessly interface with at least one of the WTRUs 502a, 502b, 502c, and/or 502d to facilitate access to one or more communication networks, such as the core network 506/507/509, the Internet 510, and/or the networks 512. By way of example, the base stations 514a and/or 514b may be a base transceiver station (BTS), a Node-B, an eNode B, a Home Node B, a Home eNode B, a site controller, an access point (AP), a wireless router, and the like. While the base stations 514a, 514b are each depicted as a single element, it will be appreciated that the base stations 514a, 514b may include any number of interconnected base stations and/or network elements.

The base station 514a may be part of the RAN 503/504/505, which may also include other base stations and/or network elements (not shown), such as a base station controller (BSC), a radio network controller (RNC), relay nodes, etc. The base station 514a and/or the base station 514b may be configured to transmit and/or receive wireless signals within a particular geographic region, which may be referred to as a cell (not shown). The cell may further be divided into cell sectors. For example, the cell associated with the base station 514a may be divided into three sectors. Thus, in one embodiment, the base station 514a may include three transceivers, i.e., one for each sector of the cell. In another embodiment, the base station 514a may employ multiple-input multiple output (MIMO) technology and, therefore, may utilize multiple transceivers for each sector of the cell.

The base stations 514a and/or 514b may communicate with one or more of the WTRUs 502a, 502b, 502c, and/or 502d over an air interface 515/516/517, which may be any suitable wireless communication link (e.g., radio frequency (RF), microwave, infrared (IR), ultraviolet (UV), visible light, etc.). The air interface 515/516/517 may be established using any suitable radio access technology (RAT).

More specifically, as noted above, the communications system 500 may be a multiple access system and may employ one or more channel access schemes, such as CDMA, TDMA, FDMA, OFDMA, SC-FDMA, and the like. For example, the base station 514a in the RAN 503/504/505 and the WTRUs 502a, 502b, and/or 502c may implement a radio technology such as Universal Mobile Telecommunications System (UMTS) Terrestrial Radio Access (UTRA), which may establish the air interface 515/516/517 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 514a and the WTRUs 502a, 502b, and/or 502c may implement a radio technology such as Evolved UMTS Terrestrial Radio Access (E-UTRA), which may establish the air interface 515/516/517 using Long Term Evolution (LTE) and/or LTE-Advanced (LTE-A).

In other embodiments, the base station 514a and the WTRUs 502a, 502b, and/or 502c may implement radio technologies such as IEEE 802.16 (i.e., Worldwide Interoperability for Microwave Access (WiMAX)), CDMA2000, CDMA2000 IX, CDMA2000 EV-DO, Interim Standard 2000 (IS-2000), interim Standard 95 (IS-95), Interim Standard 856 (IS-856), Global System for Mobile communications (GSM), Enhanced Data rates for GSM Evolution (EDGE), GSM EDGE (GERAN), and the like.

The base station 514*b* in FIG. 17A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 514*b* and the WTRUs 502*c*, 502*d* may implement a radio technology such as IEEE 802.11 to establish a wireless local area network (WLAN). In another embodiment, the base station 514*b* and the WTRUs 502*c*, 502*d* may implement a radio technology such as IEEE 802.15 to establish a wireless personal area network (WPAN). In yet another embodiment, the base station 514*b* and the WTRUs 502*c*, 502*d* may utilize a cellular-based RAT (e.g., WCDMA, CDMA2000, GSM, LTE, LTE-A, etc.) to establish a picocell or femtocell. As shown in FIG. 17A, the base station 514*b* may have a direct connection to the Internet 510. Thus, the base station 514*b* may not be required to access the Internet 510 via the core network 506/507/509.

The RAN 503/504/505 may be in communication with the core network 506/507/509, which may be any type of network configured to provide voice, data, applications, and/or voice over internet protocol (VoIP) services to one or more of the WTRUs 502*a*, 502*b*, 502*c*, and/or 502*d*. For example, the core network 506/507/509 may provide call control, billing services, mobile location-based services, pre-paid calling, Internet connectivity, video distribution, etc., and/or perform high-level security functions, such as user authentication. Although not shown in FIG. 17A, it will be appreciated that the RAN 503/504/505 and/or the core network 506/507/509 may be in direct or indirect communication with other RANs that employ the same RAT as the RAN 503/504/505 or a different RAT. For example, in addition to being connected to the RAN 503/504/505, which may be utilizing an E-UTRA radio technology, the core network 506/507/509 may also be in communication with another RAN (not shown) employing; a GSM radio technology.

The core network 506/507/509 may also serve as a gateway for the WTRUs 502*a*, 502*b*, 502*c*, and/or 502*d* to access the PSTN 508, the Internet 510, and/or other networks 512. The PSTN 508 may include circuit-switched telephone networks that provide plain old telephone service (POTS). The Internet 510 may include a global system of interconnected computer networks and devices that use common communication protocols, such as the transmission control protocol (TCP), user datagram protocol (UDP) and the internet protocol (IP) in the TCP/IP internet protocol suite. The networks 512 may include wired or wireless communications networks owned and/or operated by other service providers. For example, the networks 512 may include another core network connected to one or more RANs, which may employ the same RAT as the RAN 503/504/505 or a different RAT.

Some or all of the WTRUs 502*a*, 502*b*, 502*c*, and/or 502*d* in the communications system 500 may include multi-mode capabilities, i.e., the WTRUs 502*a*, 502*b*, 502*c*, and/or 502*d* may include multiple transceivers for communicating with different wireless networks over different wireless links. For example, the WTRU 502*c* shown in FIG. 17A may be configured to communicate with the base station 514*a*, which may employ a cellular-based radio technology, and with the base station 514*b*, which may employ an IEEE 802 radio technology.

Figure 17B:
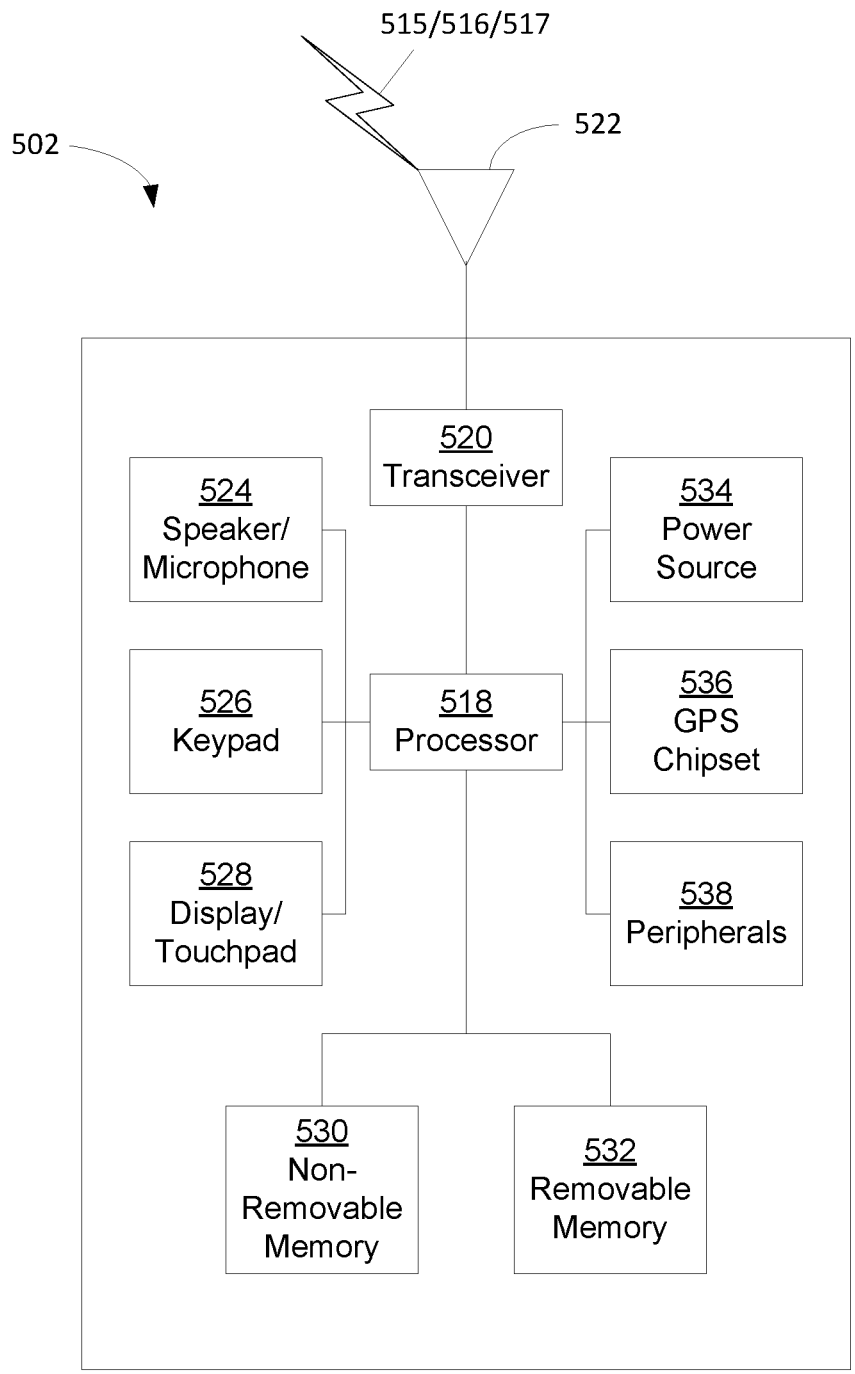
FIG. 17B depicts a system diagram of an example wireless transmit/receive unit (WTRU) that may be used within the communications system illustrated in FIG. 17A.

FIG. 17B depicts a system diagram of an example WTRU 502. As shown in FIG. 17B, the WTRU 502 may include a processor 518, a transceiver 520, a transmit/receive element 522, a speaker/microphone 524, a keypad 526, a display/touchpad 528, non-removable memory 530, removable memory 532, a power source 534, a global positioning system (GPS) chipset 536, and other peripherals 138. It will be appreciated that the WTRU 502 may include any sub-combination of the foregoing elements while remaining consistent with an embodiment. Also, embodiments contemplate that the base stations 514*a* and 514*b*, and/or the nodes that base stations 514*a* and 514*b* may represent, such as but not limited to transceiver station (BTS), Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 17B and described herein.

The processor 518 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 518 may perform signal coding, data processing, power control, input/output processing, and/or any other functionality that enables the WTRU 502 to operate in a wireless environment. The processor 518 may be coupled to the transceiver 520, which may be coupled to the transmit/receive element 522. While FIG. 17B depicts the processor 518 and the transceiver 520 as separate components, it may be appreciated that the processor 518 and the transceiver 520 may be integrated together in an electronic package or chip.

The transmit/receive element 522 may be configured to transmit signals to, or receive signals from, a base station (e.g., the base station 514*a*) over the air interface 515/516/517. For example, in one embodiment, the transmit/receive element 522 may be an antenna configured to transmit and/or receive RF signals. In another embodiment, the transmit/receive element 522 may be an emitter/detector configured to transmit and/or receive IR, UV, or visible light signals, for example. In yet another embodiment, the transmit/receive element 522 may be configured to transmit and receive both RF and light signals. It will be appreciated that the transmit/receive element 522 may be configured to transmit and/or receive any combination of wireless signals.

In addition, although the transmit/receive element 522 is depicted in FIG. 17B as a single element, the WTRU 502 may include any number of transmit/receive elements 522. More specifically, the WTRU 502 may employ MIMO technology. Thus, in one embodiment, the WTRU 502 may include two or more transmit/receive elements 522 (e.g., multiple antennas) for transmitting and receiving wireless signals over the air interface 515/516/517.

The transceiver 520 may be configured to modulate the signals that are to be transmitted by the transmit/receive element 522 and to demodulate the signals that are received by the transmit/receive element 522. As noted above, the WTRU 502 may have multi-mode capabilities. Thus, the transceiver 520 may include multiple transceivers for enabling the WTRU 502 to communicate via multiple RATs, such as UTRA and IEEE 802.11, for example.

The processor 518 of the WTRU 502 may be coupled to, and may receive user input data from, the speaker/microphone 524, the keypad 526, and/or the display/touchpad 528

(e.g., a liquid crystal display (LCD) display unit or organic light-emitting diode (OLED) display unit). The processor 518 may also output user data to the speaker/microphone 524, the keypad 526, and/or the display/touchpad 528. In addition, the processor 518 may access information from, and store data in, any type of suitable memory, such as the non-removable memory 530 and/or the removable memory 532. The non-removable memory 530 may include random-access memory (RAM), read-only memory (ROM), a hard disk, or any other type of memory storage device. The removable memory 532 may include a subscriber identity module (SIM) card, a memory stick, a secure digital (SD) memory card, and the like. In other embodiments, the processor 518 may access information from, and store data in, memory that is not physically located on the WTRU 502, such as on a server or a home computer (not shown).

The processor 518 may receive power from the power source 534, and may be configured to distribute and/or control the power to the other components in the WTRU 502. The power source 534 may be any suitable device for powering the WTRU 502. For example, the power source 534 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 518 may also be coupled to the GPS chipset 536, which may be configured to provide location information (e.g., longitude and latitude) regarding the current location of the WTRU 502. In addition to, or in lieu of, the information from the GPS chipset 536, the WTRU 502 may receive location information over the air interface 515/516/517 from a base station (e.g., base stations 514a, 514b) and/or determine its location based on the timing of the signals being received from two or more nearby base stations. It will be appreciated that the WTRU 502 may acquire location information by way of any suitable location-determination method while remaining consistent with an embodiment.

The processor 518 may further be coupled to other peripherals 538, which may include one or more software and/or hardware modules that provide additional features, functionality and/or wired or wireless connectivity. For example, the peripherals 138 may include an accelerometer, an c-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 17C:
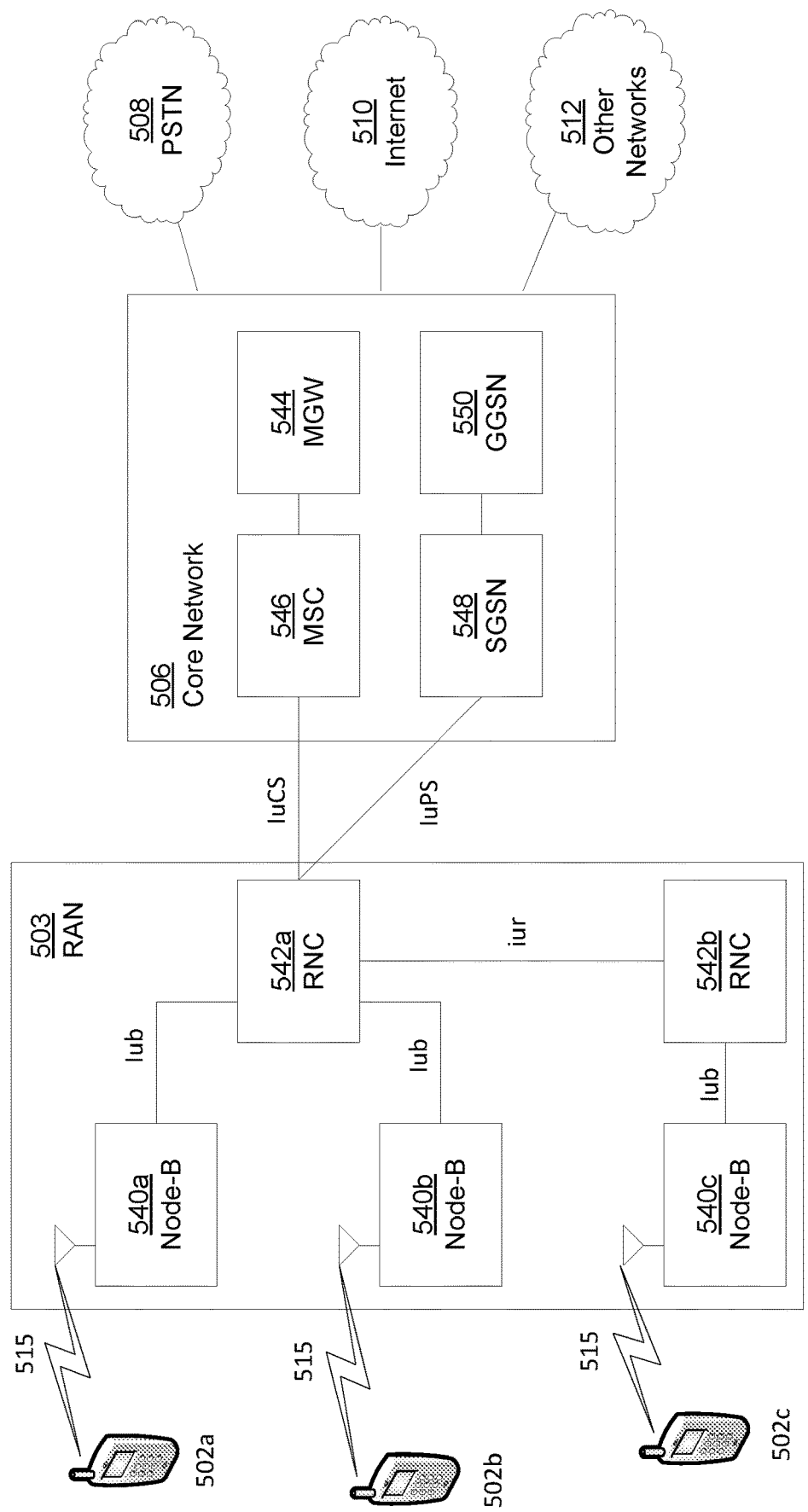
FIG. 17C depicts a system diagram of an example radio access network and an example core network that may be used within the communications system illustrated in FIG. 17A.

FIG. 17C depicts a system diagram of the RAN 503 and the core network 506 according to an embodiment. As noted above, the RAN 503 may employ a UTRA radio technology to communicate with the WTRUs 502a, 502b, and/or 502c over the air interface 515. The RAN 503 may also be in communication with the core network 506. As shown in FIG. 17C, the RAN 503 may include Node-Bs 540a, 540b, and/or 540c, which may each include one or more transceivers for communicating with the WTRUs 502a, 502b, and/or 502c over the air interface 515. The Node-Bs 540a, 540b, and/or 540c may each be associated with a particular cell (not shown) within the RAN 503. The RAN 503 may also include RNCs 542a and/or 542b. It will be appreciated that the RAN 503 may include any number of Node-Bs and RNCs while remaining consistent with an embodiment.

As shown in FIG. 17C, the Node-Bs 540a and/or 540b may be in communication with the RNC 542a. Additionally, the Node-B 540c may be in communication with the RNC 542b. The Node-Bs 540a, 540b, and/or 540c may communicate with the respective RNCs 542a, 542b via an Tub interface. The RNCs 542a, 542b may be in communication with one another via an Iur interface. Each of the RNCs 542a, 542b may be configured to control the respective Node-Bs 540a, 540b, and/or 540c to which it is connected. In addition, each of the RNCs 542a, 542b may be configured to carry out or support other functionality, such as outer loop power control, load control, admission control, packet scheduling, handover control, macrodiversity, security functions, data encryption, and the like.

The core network 506 shown in FIG. 17C may include a media gateway (MGW) 544, a mobile switching center (MSC) 546, a serving GPRS support node (SGSN) 548, and/or a gateway GPRS support node (GGSN) 550. While each of the foregoing elements are depicted as part of the core network 506, it will be appreciated that any one of these elements may be owned and/or operated by an entity other than the core network operator.

The RNC 542a in the RAN 503 may be connected to the MSC 546 in the core network 506 via an IuCS interface. The MSC 546 may be connected to the MGW 544. The MSC 546 and the MGW 544 may provide the WTRUs 502a, 502b, and/or 502c with access to circuit-switched networks, such as the PSTN 508, to facilitate communications between the WTRUs 502a, 502b, and/or 502c and traditional land-line communications devices.

The RNC 542a in the RAN 503 may also be connected to the SGSN 548 in the core network 506 via an IuPS interface. The SGSN 548 may be connected to the GGSN 550. The SGSN 548 and the GGSN 550 may provide the WTRUs 502a, 502b, and/or 502c with access to packet-switched networks, such as the Internet 510, to facilitate communications between and the WTRUs 502a, 502b, and/or 502c and IP-enabled devices.

As noted above, the core network 506 may also be connected to the networks 512, which may include other wired or wireless networks that are owned and/or operated by other service providers.

Figure 17D:
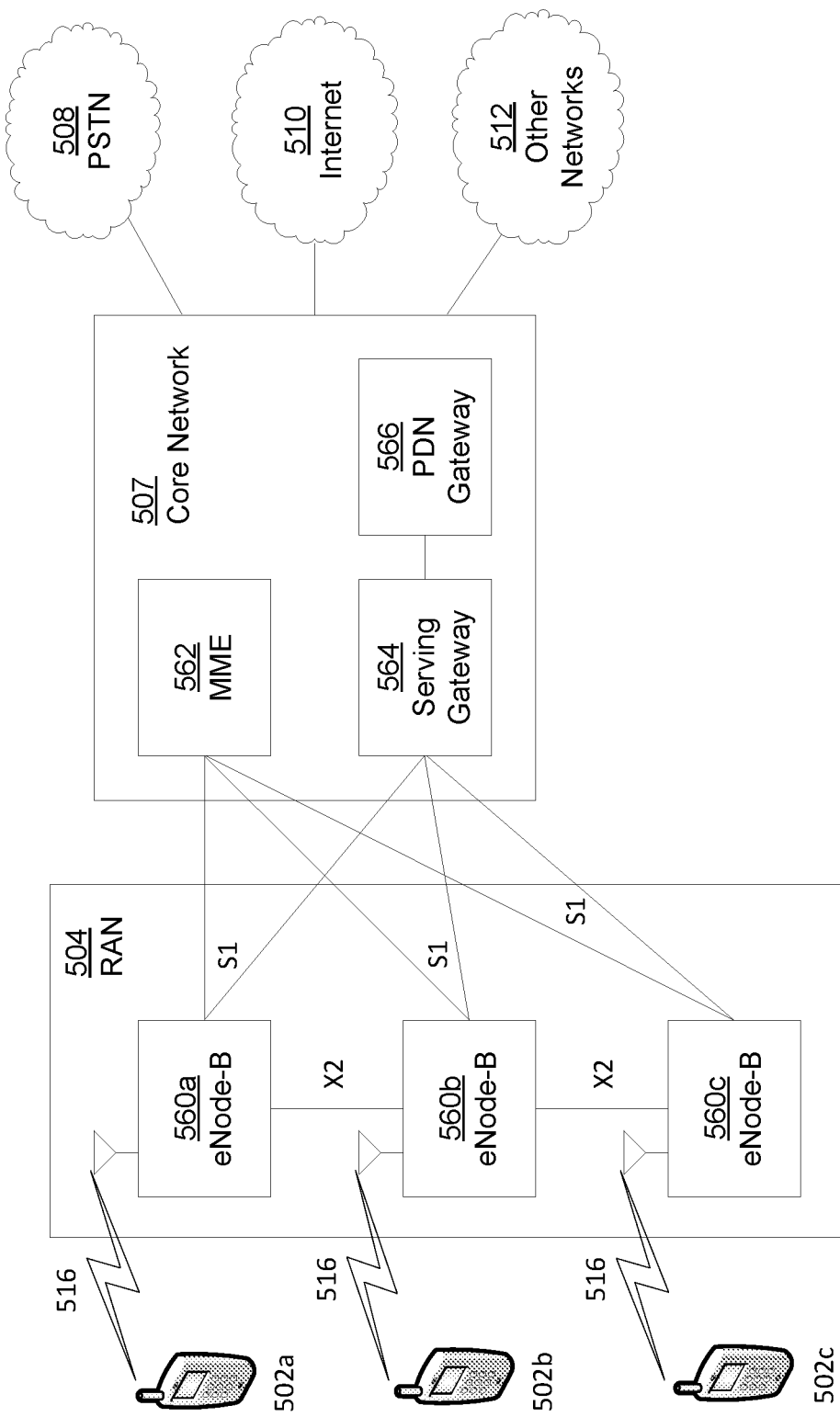
FIG. 17D depicts a system diagram of another example radio access network and an example core network that may be used within the communications system illustrated in FIG. 17A.

FIG. 17D depicts a system diagram of the RAN 504 and the core network 507 according to an embodiment. As noted above, the RAN 504 may employ an E-UTRA radio technology to communicate with the WTRUs 502a, 502b, and/or 502c over the air interface 516. The RAN 504 may also be in communication with the core network 507.

The RAN 504 may include eNode-Bs 560a, 560b, and/or 560c, though it will be appreciated that the RAN 504 may include any number of eNode-Bs while remaining consistent with an embodiment. The eNode-Bs 560a, 560b, and/or 560c may each include one or more transceivers for communicating with the WTRUs 502a, 502b, and/or 502c over the air interface 516. In one embodiment, the eNode-Bs 560a, 560b, and/or 560c may implement MIMO technology. Thus, the eNode-B 560a, for example, may use multiple antennas to transmit wireless signals to, and receive wireless signals from, the WTRU 502a.

Each of the eNode-Bs 560a, 560b, and/or 560c may be associated with a particular cell (not shown) and may be configured to handle radio resource management decisions, handover decisions, scheduling of users in the uplink and/or downlink, and the like. As shown in FIG. 17D, the Node-Bs 560a, 560b, and/or 560c may communicate with one another over an X2 interface.

The core network 507 shown in FIG. 17D may include a mobility management gateway (MME) 562, a serving gateway 564, and a packet data network (PDN) gateway 566. While each of the foregoing elements are depicted as part of the core network 507, it will be appreciated that any one of these elements may be owned and/or operated by an entity other than the core network operator.

The MME 562 may be connected to each of the eNode-Bs 560a, 560b, and/or 560c in the RAN 504 via an S1 interface and may serve as a control node. For example, the MME 562 may be responsible for authenticating users of the WTRUs 502a, 502b, and/or 502c, bearer activation/deactivation, selecting a particular serving gateway during an initial attach of the WTRUs 502a, 502b, and/or 502c, and the like. The MME 562 may also provide a control plane function for switching between the RAN 504 and other RANs (not shown) that employ other radio technologies, such as GSM or WCDMA.

The serving gateway 564 may be connected to each of the eNode-Bs 560a, 560b, and/or 560c in the RAN 504 via the S1 interface. The serving gateway 564 may generally route and forward user data packets to/from the WTRUs 502a, 502b, and/or 502c. The serving gateway 564 may also perform other functions, such as anchoring user planes during inter-eNode B handovers, triggering paging when downlink data is available for the WTRUs 502a, 502b, and/or 502c, managing and storing contexts of the WTRUs 502a, 502b, and/or 502c, and the like.

The serving gateway 564 may also be connected to the PDN gateway 566, which may provide the WTRUs 502a, 502b, and/or 502c with access to packet-switched networks, such as the Internet 510, to facilitate communications between the WTRUs 502a, 502b, and/or 502c and IP-enabled devices.

The core network 507 may facilitate communications with other networks. For example, the core network 507 may provide the WTRUs 502a, 502b, and/or 502c with access to circuit-switched networks, such as the PSTN 508, to facilitate communications between the WTRUs 502a, 502b, and/or 502c and traditional land-line communications devices. For example, the core network 507 may include, or may communicate with, an IP gateway (e.g., an IP multimedia subsystem (IMS) server) that serves as an interface between the core network 507 and the PSTN 508. In addition, the core network 507 may provide the WTRUs 502a, 502b, and/or 502c with access to the networks 512, which may include other wired or wireless networks that are owned and/or operated by other service providers.

Figure 17E:
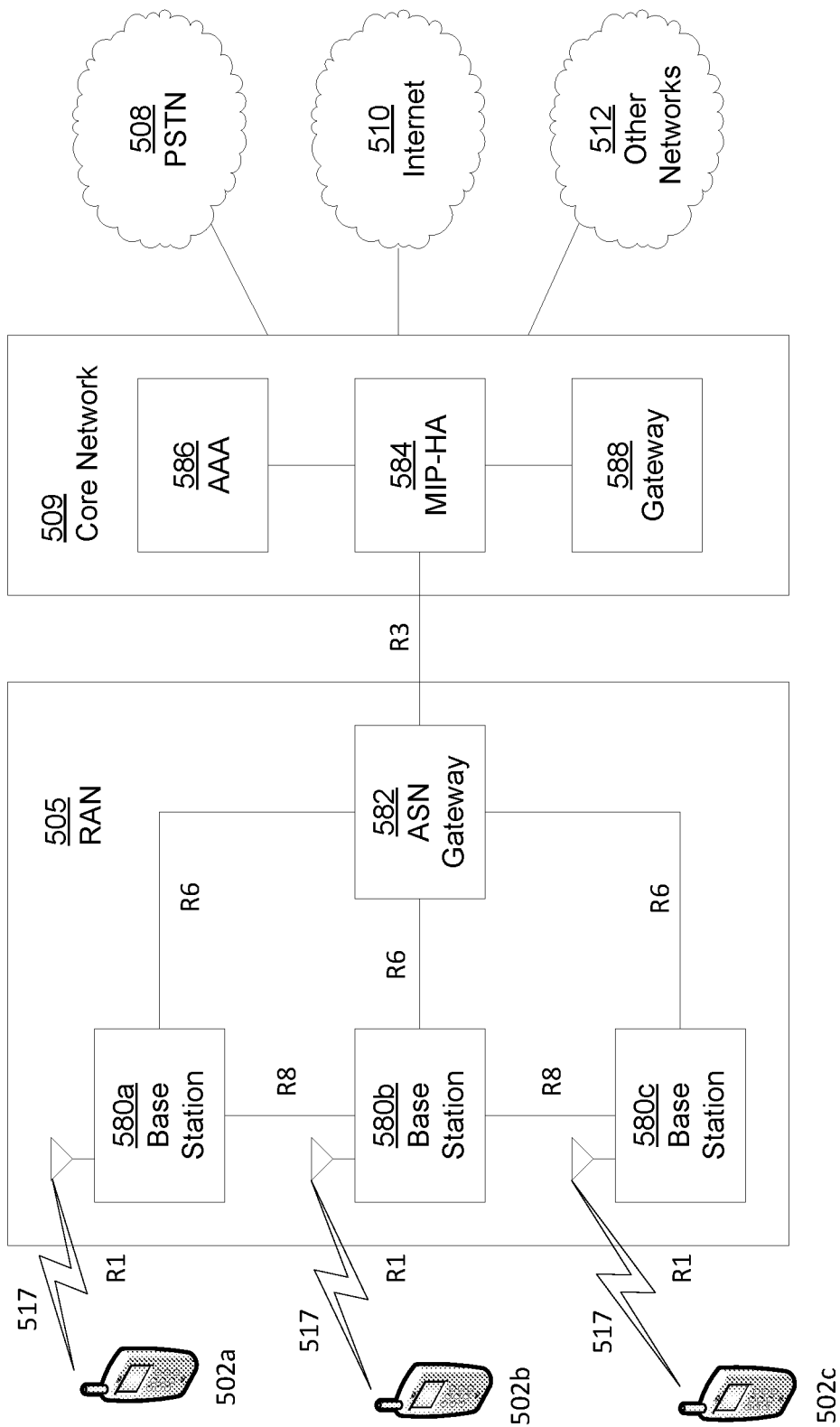
FIG. 17E depicts a system diagram of another example radio access network and an example core network that may be used within the communications system illustrated in FIG. 17A.

FIG. 17E depicts a system diagram of the RAN 505 and the core network 509 according to an embodiment. The RAN 505 may be an access service network (ASN) that employs IEEE 802.16 radio technology to communicate with the WTRUs 502a, 502b, and/or 502c over the air interface 517. As will be further discussed below, the communication links between the different functional entities of the WTRUs 502a, 502b, and/or 502c, the RAN 505, and the core network 509 may be defined as reference points.

As shown in FIG. 17E, the RAN 505 may include base stations 580a, 580b, and/or 580c, and an ASN gateway 582, though it will be appreciated that the RAN 505 may include any number of base stations and ASN gateways while remaining consistent with an embodiment. The base stations 580a, 580b, and/or 580c may each be associated with a particular cell (not shown) in the RAN 505 and may each include one or more transceivers for communicating with the WTRUs 502a, 502b, and/or 502c over the air interface 517. In one embodiment, the base stations 580a, 580b, and/or 580c may implement MIMO technology. Thus, the base station 580a, for example, may use multiple antennas to transmit wireless signals to, and receive wireless signals from, the WTRU 502a. The base stations 580a, 580b, and/or 580c may also provide mobility management functions, such as handoff triggering, tunnel establishment, radio resource management, traffic classification, quality of service (QoS) policy enforcement, and the like. The ASN gateway 582 may serve as a traffic aggregation point and may be responsible for paging, caching of subscriber profiles, routing to the core network 509, and the like.

The air interface 517 between the WTRUs 502a, 502b, and/or 502c and the RAN 505 may be defined as an R1 reference point that implements the IEEE 802.16 specification. In addition, each of the WTRUs 502a, 502b, and/or 502c may establish a logical interface (not shown) with the core network 509. The logical interface between the WTRUs 502a, 502b, and/or 502c and the core network 509 may be defined as an R2 reference point, which may be used for authentication, authorization, IP host configuration management, and/or mobility management.

The communication link between each of the base stations 580a, 580b, and/or 580c may be defined as an R8 reference point that includes protocols for facilitating WTRU handovers and the transfer of data between base stations. The communication link between the base stations 580a, 580b, and/or 580c and the ASN gateway 582 may be defined as an R6 reference point. The R6 reference point may include protocols for facilitating mobility management based on mobility events associated with each of the WTRUs 502a, 502b, and/or 502c.

As shown in FIG. 17E, the RAN 505 may be connected to the core network 509. The communication link between the RAN 505 and the core network 509 may defined as an R3 reference point that includes protocols for facilitating data transfer and mobility management capabilities, for example. The core network 509 may include a mobile IP home agent (MIP-HA) 584, an authentication, authorization, accounting (AAA) server 586, and a gateway 588. While each of the foregoing elements are depicted as part of the core network 509, it will be appreciated that any one of these elements may be owned and/or operated by an entity other than the core network operator.

The MIP-HA may be responsible for IP address management, and may enable the WTRUs 502a, 502b, and/or 502c to roam between different ASNs and/or different core networks. The MIP-HA 584 may provide the WTRUs 502a, 502b, and/or 502c with access to packet-switched networks, such as the Internet 510, to facilitate communications between the WTRUs 502a, 502b, and/or 502c and IP-enabled devices. The AAA server 586 may be responsible for user authentication and for supporting user services. The gateway 588 may facilitate interworking with other networks. For example, the gateway 588 may provide the WTRUs 502a, 502b, and/or 502c with access to circuit-switched networks, such as the PSTN 508, to facilitate communications between the WTRUs 502a, 502b, and/or 502c and traditional land-line communications devices. In addition, the gateway 588 may provide the WTRUs 502a, 502b, and/or 502c with access to the networks 512, which may include other wired or wireless networks that are owned and/or operated by other service providers.

Although not shown in FIG. 17E, it should, may, and/or will be appreciated that the RAN 505 may be connected to other ASNs and the core network 509 may be connected to other core networks. The communication link between the RAN 505 the other ASNs may be defined as an R4 reference point, which may include protocols for coordinating the mobility of the WTRUs 502a, 502b, and/or 502c between the RAN 505 and the other ASNs. The communication link between the core network 509 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for distributing media content among a group of cache devices, the method comprising:
    receiving content preference information and device property information associated with the group of cache devices;
    determining, based on the content preference information associated with the group of cache devices that a content object available at a content source is relevant to at least one cache device of the group of cache devices;
    determining, based on scalability information associated with the content object, that the content object comprises a base layer and an enhancement layer that depends on the base layer for decoding;
    selecting, based at least on the scalability information associated with the content object and the device property information associated with the group of cache devices, a first cache device from the group of cache devices for caching the base layer of the content object and a second cache device from the group of cache devices for caching the enhancement layer of the content object, wherein the device property information associated with the group of cache devices comprises a viewing habit associated with the first cache device, and wherein the first cache device is selected for caching the base layer of the content object based on an indication from the viewing habit that the first cache device is used to view content outside a home network at a frequency above a threshold value; and
    transmitting instructions to the first cache device to cache the base layer of the content object and to the second cache device to cache the enhancement layer of the content object.

2. The method of claim 1, wherein the content preference information associated with the group of cache devices comprises subscription information associated with the user, and the prediction that the content object is desired by the user is made further in response to determining that the user has subscribed to the content object.

3. The method of claim 1, wherein the scalability information associated with the content object comprises respective resolutions or color gamuts of the base layer and the enhancement layer of the content object, the device property information indicates respective capabilities of the first and second cache devices for caching the base layer and the enhancement layer of the content object, the first cache device is selected based on a determination that the first cache device is capable of caching the base layer of the content object, and the second cache device is selected based on a determination that the second cache device is capable of caching the enhancement layer of the content object.

4. The method of claim 3, wherein the device property information associated with the group of cache devices comprises at least one of a display resolution, a storage size, an available network bandwidth, a caching history, a viewing habit, a decoding capability, or an access permission associated with the group of cache devices.

5. The method of claim 1, wherein the group of cache devices comprises a home gateway and a plurality of end user devices capable of connecting to the home gateway and playing back the content object, where the content preference information associated with the group of cache devices comprises respective content preferences of the plurality of end user devices, wherein, on a condition that the content object meets the content preferences of at least two of the plurality of end user devices and that the home gateway is capable of storing the base layer of the content object, the home gateway is selected for caching the base layer of the content object, and wherein, on a condition that one of the at least two of the plurality of end user devices is capable of displaying and storing the enhancement layer of the content object, the one of the at least two of the plurality end user devices is selected for caching the enhancement layer of the content object.

6. The method of claim 1, wherein the group of cache devices comprises a cache server outside a home network and a home device within the home network that is capable of accessing the cache server, wherein the content preference information associated with the group of cache devices comprises a content preference of the home device, and wherein:
    the home device is selected as the first cache device for caching the base layer of the content object on a condition that the content object meets the content preference of the home device, and that the home device is capable of caching the base layer of the content object; and
    the cache server is selected as the second cache device for caching the enhancement layer of the content object on a condition that the content object meets the content preference of the home device, and that the cache server is capable of caching the enhancement layer of the content object.

7. The method of claim 1, further comprising receiving access privilege information of the content object, wherein the first cache device is selected for caching the base layer of the content object based further on a condition that the first cache device is authorized, according to the access privilege information, to access the base layer of the content object.

8. The method of claim 1, wherein receiving content preference information and device property information associated with the group of cache devices comprises discovering the group of cache devices via a device discovery protocol.

9. The method of claim 1, wherein the method is implemented on at least one of the first or second cache device.

10. A method for distributing media content among a group of cache devices, the method comprising:

receiving content preference information and device property information associated with the group of cache devices;

monitoring content availability associated with a content source;

determining, based on the content preference information associated with the group of cache devices and content availability information associated with the content source, that a content object available at the content source is relevant to at least one cache device of the group of cache devices;

determining, based on scalability information associated with the content object, that the content object comprises a base layer and an enhancement layer that depends on the base layer for decoding;

selecting, based at least on the scalability information associated with the content object and the device property information associated with the group of cache devices, a first cache device from the group of cache devices for caching the base layer of the content object and a second cache device from the group of cache devices for caching the enhancement layer of the content object, wherein the device property information associated with the group of cache devices comprises a viewing habit associated with the first cache device, and wherein the first cache device is selected for caching the base layer of the content object based on an indication from the viewing habit that the first cache device is used to view content outside a home network at a frequency above a threshold value; and transmitting instructions to the first cache device to cache the base layer of the content object and to the second cache device to cache the enhancement layer of the content object.

11. A controller for distributing media content among a group of cache devices, comprising:

a processor configured to:

receive content preference information and device property information associated with the group of cache devices, wherein the content preference information comprises a viewing history associated with a user of at least one cache device of the group of cache devices;

predict, based on the received content preference information associated with the group of cache devices and content availability information associated with the content source, that a content object available at the content source is desired by the user, wherein the prediction is made in response to determining that the viewing history associated with the user indicates a preference for the content object by the user, and wherein scalability information associated with the content source indicates that the content object comprises a base layer and an enhancement layer that depends on the base layer for decoding;

select, based at least on the scalability information associated with the content object and the device property information associated with the group of cache devices, a first cache device from the group of cache devices for caching the base layer of the content object and a second cache device from the group of cache devices for caching the enhancement layer of the content object, wherein the device property information associated with the group of cache devices comprises a viewing habit associated with the first cache device, and wherein the first cache device is selected for caching the base layer of the content object based on an indication from the viewing habit that the first cache device is used to view content outside a home network at a frequency above a threshold value; and transmit instructions to the first cache device to cache the base layer of the content object and to the second cache device to cache the enhancement layer of the content object.

12. The controller of claim 11, wherein the content preference information associated with the group of cache devices comprises subscription information associated with the user, and the prediction that the content object is desired by the user is made further in response to the processor determining that the user has a subscription to the content object.

13. The controller of claim 11, wherein the scalability information associated with the content object comprises respective resolutions or color gamuts of the base layer and the enhancement layer of the content object, the device property information indicates respective capabilities of the first and second cache devices for caching the base layer and the enhancement layer of the content object, the first cache device is selected based on a determination that the first cache device is capable of caching the base layer the content object, and the second cache device is selected based on a determination that the second cache device is capable of caching the enhancement layer of the content object.

14. The controller of claim 13, wherein the device property information associated with the group of cache devices comprises at least one of a display resolution, a storage size, an available network bandwidth, a caching history, a viewing habit, a decoding capability, or an access permission associated with the group of cache devices.

15. The controller of claim 11, wherein the group of cache devices comprises a home gateway and a plurality of end user devices capable of connecting to the home gateway and playing back the content object, where the content preference information associated with the group of cache devices comprises respective content preferences of the plurality of end user devices, and wherein the processor is configured to select the home gateway for caching the base layer of the content object based on a condition that the content object meets the content preferences of at least two of the plurality of end user devices and that the home gateway is capable of storing the base layer of the content object, the processor further configured to select one of the at least two of the plurality end user devices for caching the enhancement layer of the content object based on a condition that the one of the at least two of the plurality of end user devices is capable of displaying and storing the enhancement layer of the content object.

16. The controller of claim 11, wherein the group of cache devices comprises a cache server outside a home network and a home device within the home network that is capable of accessing the cache server, wherein the content preference information associated with the group of cache devices comprises a content preference of the home device, and wherein the processor is configured to:

select the home device for caching the base layer of the content object based on a condition that the content object meets the content preference of the home device and that the home device is capable of caching the base layer of the content object; and select the cache server for caching the enhancement layer of the content object based on a condition that the content object meets the content preference of the home device and that the cache server is capable of caching the enhancement layer of the content object.

17. The controller of claim 16, wherein the home device comprises at least one of a home gateway or an end user device that is capable of decoding and displaying the content object.

18. The controller of claim 11, wherein the processor is further configured to receive access privilege information of the content object, and to select the first cache device for caching the base layer of the content object based further on a condition that the first cache device is authorized, according to the access privilege information, to access the base layer of the content object.

19. The controller of claim 11, wherein the processor being configured to receive content preference information and device property information associated with the group of cache devices comprises the processor being configured to discover the group of cache devices via a device discovery protocol.

* * * * *